US006418492B1

(12) United States Patent
Papa et al.

(10) Patent No.: US 6,418,492 B1
(45) Date of Patent: Jul. 9, 2002

(54) METHOD FOR COMPUTER IMPLEMENTED HOT-SWAP AND HOT-ADD

(75) Inventors: Stephen E. J. Papa, Santa Cruz; Dennis H. Smith, Fremont; Walter A. Wallach, Los Altos, all of CA (US)

(73) Assignee: Micron Electronics, Nampa, ID (US)

( * ) Notice: Subject to any disclaimer, the term of this patent is extended or adjusted under 35 U.S.C. 154(b) by 0 days.

(21) Appl. No.: 08/941,970

(22) Filed: Oct. 1, 1997

Related U.S. Application Data

(60) Provisional application No. 60/046,398, filed on May 13, 1997, and provisional application No. 60/046,312, filed on May 13, 1997.

(51) Int. Cl.[7] .............................................. G06F 13/00

(52) U.S. Cl. ................... 710/103; 710/102; 710/129; 710/128

(58) Field of Search ................................ 395/281–283, 395/306–309, 284–285, 500; 345/308; 380/49

(56) References Cited

U.S. PATENT DOCUMENTS

| 4,057,847 A | 11/1977 | Lowell et al. ............... 364/200 |
| 4,100,597 A | 7/1978 | Fleming et al. ............. 364/474 |
| 4,449,182 A | 5/1984 | Rubinson et al. ........... 364/200 |
| 4,672,353 A | 6/1987 | Katzman et al. ............ 364/200 |
| 4,692,918 A | 9/1987 | Elliott et al. ................. 370/85 |
| 4,695,946 A | 9/1987 | Andreasen et al. ......... 364/200 |
| 4,707,803 A | 11/1987 | Anthony, Jr. et al. |
| 4,769,764 A | 9/1988 | Levanon ..................... 364/708 |
| 4,774,502 A | 9/1988 | Kimura ....................... 340/501 |
| 4,821,180 A | 4/1989 | Gerety et al. ................ 364/200 |
| 4,894,792 A | 1/1990 | Mitchell et al. ............. 364/708 |
| 5,006,961 A | 4/1991 | Monico |

(List continued on next page.)

FOREIGN PATENT DOCUMENTS

| EP | 0 866 403 A1 | 9/1998 | |
| JP | 04 333 118 | 11/1992 | ............. G06F/1/18 |
| JP | 5-233 110 | 9/1993 | ............. G06F/3/00 |

(List continued on next page.)

OTHER PUBLICATIONS

Standard Overview, http://www.pc-card.com/stand_overview.html#1, 9 pages, Jun. 1990, "Detailed Overview of the PC Card Standard."

Digital Equipment Corporation, *datasheet*, 140 pages, 1993, "DECchip 21050 PCI–TO–PCI Bridge."

NetFRAME Systems Incorporated, *News Release*, 3 pages, referring to May 9, 1994, "NetFRAME's New High–Availability ClusterServer Systems Avoid Scheduled as well as Unscheduled Downtime."

(List continued on next page.)

*Primary Examiner*—Robert Beausoleil
*Assistant Examiner*—Raymond N Phan
(74) *Attorney, Agent, or Firm*—Knobbe, Martens, Olson & Bear LLP

(57) ABSTRACT

Apparatus and method is disclosed for providing hot-add and hot swap capability to a computer system with a processor, and a memory, connected to a system bus. The apparatus includes a first bus, an adapter card slot, a switchable interface unit and hot-swap hot-add program code means. The first bus is connected to the system bus. The adapter card slot has a first port and a second port. The switchable interface unit includes a primary port and a secondary port. The primary port is connected to the first bus and the secondary port is connected to the first port of the adapter card slot. The switchable interface unit is responsive to a hot-swap hot-add power-down request to disconnect the second port from the first bus. The switchable interface unit is also responsive to a power-up request to reconnect the second port to the first bus. The hot-swap hot-add program code means in the memory accepts a request to connect a peripheral device adapter card into the second port of said adapter card slot, and responsive to the request communicates a power-down request to the switchable interface unit.

17 Claims, 15 Drawing Sheets

U.S. PATENT DOCUMENTS

| | | | |
|---|---|---|---|
| 5,007,431 A | 4/1991 | Donehoo, III | 128/696 |
| 5,033,048 A | 7/1991 | Pierce et al. | 371/21.2 |
| 5,051,720 A | 9/1991 | Kittirutsunetorn | 340/310 R |
| 5,073,932 A | 12/1991 | Yossifor et al. | 380/23 |
| 5,103,391 A | 4/1992 | Barrett | 364/133 |
| 5,118,970 A | 6/1992 | Olson et al. | 307/443 |
| 5,121,500 A | 6/1992 | Arlington et al. | 395/750 |
| 5,123,017 A | 6/1992 | Simpkins et al. | 371/15.1 |
| 5,136,708 A | 8/1992 | Lapourtre et al. | 395/650 |
| 5,136,715 A | 8/1992 | Hirose et al. | 395/775 |
| 5,138,619 A | 8/1992 | Fasang et al. | 371/21.1 |
| 5,157,663 A | 10/1992 | Major et al. | 371/9.1 |
| 5,210,855 A | 5/1993 | Bartol | 395/500 |
| 5,222,897 A | 6/1993 | Collins et al. | 439/157 |
| 5,245,615 A | 9/1993 | Treu | 371/16.5 |
| 5,247,683 A | 9/1993 | Holmes et al. | 395/700 |
| 5,253,348 A | 10/1993 | Scalise | 395/325 |
| 5,261,094 A | 11/1993 | Everson et al. | 395/600 |
| 5,265,098 A | 11/1993 | Mattson et al. | 371/11.1 |
| 5,266,838 A | 11/1993 | Gerner | 307/19 |
| 5,272,382 A | 12/1993 | Heald et al. | 307/66 |
| 5,272,584 A | 12/1993 | Austruy et al. | 361/58 |
| 5,276,814 A | 1/1994 | Bourke et al. | 395/275 |
| 5,276,863 A | 1/1994 | Heider | 395/575 |
| 5,277,615 A | 1/1994 | Hastings et al. | 439/377 |
| 5,280,621 A | 1/1994 | Barnes et al. | 395/800 |
| 5,283,905 A | 2/1994 | Saadeh et al. | 395/750 |
| 5,307,354 A | 4/1994 | Cramer et al. | |
| 5,311,397 A | 5/1994 | Harshberger et al. | 361/683 |
| 5,311,451 A | 5/1994 | Barrett | 364/550 |
| 5,337,413 A | 8/1994 | Lui et al. | 395/275 |
| 5,351,276 A | 9/1994 | Doll, Jr. et al. | |
| 5,367,670 A | 11/1994 | Ward et al. | 395/575 |
| 5,379,184 A | 1/1995 | Barraza et al. | 361/685 |
| 5,379,409 A | 1/1995 | Ishikawa | 395/575 |
| 5,388,267 A | 2/1995 | Chan et al. | 395/700 |
| 5,402,431 A | 3/1995 | Saadeh et al. | 371/67.1 |
| 5,404,494 A | 4/1995 | Garney | |
| 5,423,025 A | 6/1995 | Goldman et al. | 395/575 |
| 5,430,717 A | 7/1995 | Fowler et al. | 370/58.2 |
| 5,430,845 A | 7/1995 | Rimmer et al. | 395/275 |
| 5,432,715 A | 7/1995 | Shigematsu et al. | 364/551.01 |
| 5,432,946 A | 7/1995 | Allard et al. | 395/750 |
| 5,438,678 A | 8/1995 | Smith | 395/750 |
| 5,440,748 A | 8/1995 | Sekine et al. | |
| 5,448,723 A | 9/1995 | Rowett | 395/200.02 |
| 5,455,933 A | 10/1995 | Schieve et al. | 395/183.03 |
| 5,460,441 A | 10/1995 | Hastings et al. | 312/298 |
| 5,463,766 A | 10/1995 | Schieve et al. | 395/650 |
| 5,465,349 A | 11/1995 | Geronimi et al. | 364/550 |
| 5,471,617 A | 11/1995 | Farrand et al. | 395/700 |
| 5,471,634 A | 11/1995 | Giorgio et al. | 395/600 |
| 5,473,499 A | 12/1995 | Weir | 361/58 |
| 5,483,419 A * | 1/1996 | Kaczeus et al. | 361/685 |
| 5,485,550 A | 1/1996 | Dalton | 395/51 |
| 5,485,607 A | 1/1996 | Lomet et al. | 395/600 |
| 5,487,148 A | 1/1996 | Komori et al. | |
| 5,491,791 A | 2/1996 | Glowny et al. | |
| 5,513,314 A | 4/1996 | Kandasamy et al. | 395/182.04 |
| 5,513,339 A | 4/1996 | Agrawal et al. | 395/500 |
| 5,515,515 A | 5/1996 | Kennedy et al. | 395/283 |
| 5,519,851 A | 5/1996 | Bender et al. | 395/500 |
| 5,526,289 A | 6/1996 | Dinh et al. | 364/557 |
| 5,528,409 A | 6/1996 | Cucci et al. | 359/171 |
| 5,530,810 A | 6/1996 | Bowman | 395/283 |
| 5,533,193 A | 7/1996 | Roscoe | 395/183.15 |
| 5,533,198 A | 7/1996 | Thorson | 395/200.15 |
| 5,535,326 A | 7/1996 | Baskey et al. | 395/182.02 |
| 5,539,883 A | 7/1996 | Allon et al. | 395/200.11 |
| 5,542,055 A | 7/1996 | Amini et al. | 395/281 |
| 5,546,272 A | 8/1996 | Moss et al. | 361/687 |
| 5,548,712 A | 8/1996 | Larson et al. | 395/182.05 |
| 5,559,764 A | 9/1996 | Chen et al. | 396/30 |
| 5,559,958 A | 9/1996 | Farrand et al. | 395/183.03 |
| 5,559,965 A | 9/1996 | Oztaskin et al. | |
| 5,560,022 A | 9/1996 | Dunstan et al. | 395/750 |
| 5,564,204 A | 10/1996 | Pemberton | 395/283 |
| 5,566,299 A | 10/1996 | Billings et al. | 395/182.02 |
| 5,566,339 A | 10/1996 | Perholtz et al. | 395/750 |
| 5,568,619 A | 10/1996 | Blackledge et al. | |
| 5,572,403 A | 11/1996 | Mills | 361/695 |
| 5,577,205 A | 11/1996 | Hwang et al. | |
| 5,579,487 A | 11/1996 | Meyerson et al. | 395/280 |
| 5,579,491 A | 11/1996 | Jeffries et al. | 395/283 |
| 5,579,528 A | 11/1996 | Register | 395/671 |
| 5,581,714 A | 12/1996 | Amini et al. | |
| 5,584,030 A * | 12/1996 | Husak et al. | 710/103 |
| 5,586,250 A | 12/1996 | Carbonneau et al. | 395/183.2 |
| 5,588,121 A | 12/1996 | Reddin et al. | 395/200.15 |
| 5,592,610 A | 1/1997 | Chittor | 395/182.02 |
| 5,592,611 A | 1/1997 | Midgely et al. | 395/182.02 |
| 5,596,711 A | 1/1997 | Burckhartt et al. | 395/182.21 |
| 5,598,407 A | 1/1997 | Bud et al. | 370/330 |
| 5,602,758 A | 2/1997 | Lincoln et al. | 364/505 |
| 5,604,873 A | 2/1997 | Fite et al. | 395/283 |
| 5,608,865 A | 3/1997 | Midgely et al. | 395/180 |
| 5,608,876 A | 3/1997 | Cohen et al. | 395/281 |
| 5,621,159 A | 4/1997 | Brown et al. | 73/9 |
| 5,621,892 A | 4/1997 | Cook | 395/200.1 |
| 5,622,221 A | 4/1997 | Genga, Jr. et al. | 165/208 |
| 5,625,238 A | 4/1997 | Ady et al. | 307/147 |
| 5,627,962 A | 5/1997 | Goodrum et al. | 395/182.11 |
| 5,628,028 A | 5/1997 | Michelson | 395/825 |
| 5,630,076 A | 5/1997 | Saulpaugh et al. | 395/284 |
| 5,631,847 A | 5/1997 | Kikinis | 364/514 R |
| 5,632,021 A | 5/1997 | Jennings et al. | 395/309 |
| 5,636,341 A | 6/1997 | Matsushita et al. | 395/182.11 |
| 5,638,289 A * | 6/1997 | Yamada et al. | 364/489 |
| 5,644,731 A | 7/1997 | Liencres et al. | 395/283 |
| 5,652,833 A | 7/1997 | Takizawa et al. | 395/182.08 |
| 5,652,839 A | 7/1997 | Giorgio et al. | 395/200.11 |
| 5,652,892 A | 7/1997 | Ugajin | 395/750 |
| 5,652,908 A | 7/1997 | Douglas et al. | 395/800 |
| 5,655,081 A | 8/1997 | Bonnell et al. | |
| 5,655,083 A | 8/1997 | Bagley | 395/182.31 |
| 5,655,148 A | 8/1997 | Richman et al. | |
| 5,659,682 A | 8/1997 | Devarakonda et al. | |
| 5,664,118 A | 9/1997 | Nishigaki et al. | 395/283 |
| 5,664,119 A * | 9/1997 | Jeffries et al. | 395/283 |
| 5,666,538 A | 9/1997 | DeNicola | |
| 5,668,943 A | 9/1997 | Attanasio et al. | 395/182.05 |
| 5,668,992 A | 9/1997 | Hammer et al. | 395/651 |
| 5,669,009 A | 9/1997 | Buktenica et al. | 395/800.35 |
| 5,671,371 A | 9/1997 | Kondo et al. | 395/306 |
| 5,675,723 A | 10/1997 | Ekrot et al. | |
| 5,682,328 A | 10/1997 | Roeber et al. | 364/550 |
| 5,684,671 A | 11/1997 | Hobbs et al. | |
| 5,689,637 A | 11/1997 | Johnson et al. | |
| 5,696,895 A | 12/1997 | Hemphill et al. | 395/182.02 |
| 5,696,899 A | 12/1997 | Kalwitz | |
| 5,696,949 A | 12/1997 | Young | 395/551 |
| 5,701,417 A | 12/1997 | Lewis et al. | 395/200.16 |
| 5,704,031 A | 12/1997 | Mikami et al. | 395/182.02 |
| 5,708,775 A | 1/1998 | Nakamura | 395/185.01 |
| 5,708,776 A | 1/1998 | Kikinis | 395/185.08 |
| 5,712,745 A | 1/1998 | Sides et al. | 361/58 |
| 5,715,456 A | 2/1998 | Bennett et al. | 395/652 |
| 5,717,570 A | 2/1998 | Kikinis | 361/685 |
| 5,721,935 A | 2/1998 | DeSchepper et al. | 395/750 |
| 5,724,529 A | 3/1998 | Smith et al. | |
| 5,727,207 A | 3/1998 | Gates et al. | 395/651 |

| | | | |
|---|---|---|---|
| 5,732,266 A | 3/1998 | Moore et al. | 395/651 |
| 5,737,708 A | 4/1998 | Grob et al. | 455/557 |
| 5,737,747 A | 4/1998 | Vishlitzky et al. | 711/118 |
| 5,740,378 A * | 4/1998 | Rehl et al. | 395/283 |
| 5,742,514 A | 4/1998 | Bonola | 364/492 |
| 5,742,833 A | 4/1998 | Dea et al. | 395/750.05 |
| 5,752,164 A | 5/1998 | Jones | 455/33.1 |
| 5,754,396 A | 5/1998 | Felcman et al. | 361/683 |
| 5,754,449 A | 5/1998 | Hoshal et al. | 364/550 |
| 5,754,797 A * | 5/1998 | Takahashi | 710/103 |
| 5,758,165 A | 5/1998 | Shuff | 395/712 |
| 5,758,352 A | 5/1998 | Reynolds et al. | 707/200 |
| 5,761,045 A * | 6/1998 | Olson et al. | 364/726 |
| 5,761,085 A | 6/1998 | Giorgio | 364/505 |
| 5,761,462 A | 6/1998 | Neal et al. | |
| 5,761,707 A | 6/1998 | Aiken et al. | 711/118 |
| 5,764,924 A | 6/1998 | Hong | 395/281 |
| 5,765,008 A | 6/1998 | Desai et al. | |
| 5,767,844 A | 6/1998 | Stoye | 345/212 |
| 5,771,343 A | 6/1998 | Hafner et al. | 395/182.02 |
| 5,774,640 A | 6/1998 | Kurio | 395/182.02 |
| 5,774,645 A | 6/1998 | Beaujard et al. | 395/183.01 |
| 5,774,741 A | 6/1998 | Choi | |
| 5,809,311 A | 6/1998 | Jones | 395/750.01 |
| 5,777,897 A | 7/1998 | Giorgio | 364/557 |
| 5,778,197 A * | 7/1998 | Dunham | 710/104 |
| 5,781,703 A | 7/1998 | Desai et al. | |
| 5,781,716 A | 7/1998 | Hemphill et al. | 395/182.02 |
| 5,781,744 A | 7/1998 | Johnson et al. | 395/283 |
| 5,781,798 A * | 7/1998 | Beatty et al. | 395/830 |
| 5,784,555 A | 7/1998 | Stone | 395/200.5 |
| 5,787,019 A | 7/1998 | Knight et al. | 364/550 |
| 5,787,459 A | 7/1998 | Stallmo et al. | 711/112 |
| 5,787,491 A | 7/1998 | Merkin et al. | 711/173 |
| 5,790,775 A | 8/1998 | Mark et al. | 395/182.07 |
| 5,793,948 A | 8/1998 | Asahi et al. | 395/184.01 |
| 5,793,987 A * | 8/1998 | Quackenbush et al. | 395/281 |
| 5,796,580 A | 8/1998 | Komatsu et al. | 361/687 |
| 5,796,934 A | 8/1998 | Bhanot et al. | 395/182.02 |
| 5,797,023 A | 8/1998 | Berman et al. | 395/750.06 |
| 5,799,196 A | 8/1998 | Flannery | 395/750.03 |
| 5,801,921 A | 9/1998 | Miller | |
| 5,802,298 A | 9/1998 | Imai et al. | 395/200.47 |
| 5,802,305 A | 9/1998 | McKaughan et al. | 395/200.57 |
| 5,802,324 A * | 9/1998 | Wunderlich et al. | 710/101 |
| 5,802,592 A | 9/1998 | Chess et al. | 711/164 |
| 5,803,357 A | 9/1998 | Lakin | 236/78 B |
| 5,805,804 A | 9/1998 | Laursen et al. | 395/200.02 |
| 5,809,256 A | 9/1998 | Najemy | 395/283 |
| 5,809,287 A | 9/1998 | Stupek, Jr. et al. | 395/500 |
| 5,809,555 A | 9/1998 | Hobson | 711/172 |
| 5,812,748 A | 9/1998 | Ohran et al. | 395/182.02 |
| 5,812,750 A | 9/1998 | Dev et al. | |
| 5,815,647 A | 9/1998 | Buckland et al. | 395/182.01 |
| 5,815,651 A | 9/1998 | Litt | 395/182.08 |
| 5,815,652 A | 9/1998 | Ote et al. | |
| 5,821,596 A | 10/1998 | Mui et al. | 257/419 |
| 5,826,043 A | 10/1998 | Smith et al. | 395/281 |
| 5,829,046 A | 10/1998 | Tzelnic et al. | 711/162 |
| 5,835,719 A | 11/1998 | Gibson et al. | 395/200.51 |
| 5,835,738 A | 11/1998 | Blackledge, Jr. et al. | |
| 5,838,932 A * | 11/1998 | Alzien | 710/128 |
| 5,841,964 A | 11/1998 | Yamaguchi | 395/113.21 |
| 5,841,991 A | 11/1998 | Russell | |
| 5,845,061 A | 12/1998 | Miyamoto et al. | 395/182.02 |
| 5,845,095 A | 12/1998 | Reed et al. | 395/382 |
| 5,850,546 A | 12/1998 | Kim | 395/651 |
| 5,852,720 A | 12/1998 | Gready et al. | |
| 5,852,724 A | 12/1998 | Glenn, II et al. | 395/200.69 |
| 5,857,074 A | 1/1999 | Johnson | |
| 5,857,102 A | 1/1999 | McChesney et al. | 395/653 |
| 5,864,653 A | 1/1999 | Tavallaei et al. | 315/181 |
| 5,864,654 A | 1/1999 | Marchant | 395/182.01 |
| 5,864,713 A | 1/1999 | Terry | 395/872 |
| 5,867,730 A | 2/1999 | Leyda | 395/830 |
| 5,875,307 A | 2/1999 | Ma et al. | 395/281 |
| 5,875,308 A | 2/1999 | Egan et al. | 395/283 |
| 5,875,310 A | 2/1999 | Buckland et al. | 395/306 |
| 5,878,237 A | 3/1999 | Olarig | 395/308 |
| 5,878,238 A * | 3/1999 | Gan et al. | 710/128 |
| 5,881,311 A | 3/1999 | Woods | 395/824 |
| 5,884,027 A | 3/1999 | Garbus et al. | 395/200.8 |
| 5,884,049 A | 3/1999 | Atkinson | 395/281 |
| 5,886,424 A | 3/1999 | Kim | 307/64 |
| 5,889,965 A | 3/1999 | Wallach et al. | 395/283 |
| 5,892,898 A | 4/1999 | Fujii et al. | 395/185.1 |
| 5,892,915 A | 4/1999 | Duso et al. | 395/200.49 |
| 5,892,928 A | 4/1999 | Wallach et al. | 395/283 |
| 5,893,140 A | 4/1999 | Vahalia et al. | 711/118 |
| 5,898,846 A | 4/1999 | Kelly | 395/284 |
| 5,898,888 A | 4/1999 | Guthrie et al. | 395/308 |
| 5,905,867 A | 5/1999 | Giorgio | 395/200.54 |
| 5,907,672 A | 5/1999 | Matze et al. | 395/182.06 |
| 5,909,568 A | 6/1999 | Nason | 395/500 |
| 5,911,779 A | 6/1999 | Stallmo et al. | 714/6 |
| 5,913,034 A | 6/1999 | Malcolm | 395/200.53 |
| 5,922,060 A | 7/1999 | Goodrum | 710/103 |
| 5,930,358 A | 7/1999 | Rao | 380/4 |
| 5,935,262 A | 8/1999 | Barrett et al. | 714/46 |
| 5,936,960 A | 8/1999 | Stewart | 370/438 |
| 5,938,751 A | 8/1999 | Tavallaei et al. | 710/103 |
| 5,941,996 A | 8/1999 | Smith et al. | 714/47 |
| 5,964,855 A | 10/1999 | Bass et al. | 710/103 |
| 5,983,349 A | 11/1999 | Kodama et al. | 713/200 |
| 5,987,554 A | 11/1999 | Liu et al. | 710/129 |
| 5,987,621 A | 11/1999 | Duso et al. | 714/4 |
| 5,987,627 A | 11/1999 | Rawlings, III | 714/48 |
| 6,012,130 A | 1/2000 | Beyda et al. | 711/173 |
| 6,038,624 A | 3/2000 | Chan et al. | 710/103 |

FOREIGN PATENT DOCUMENTS

| | | | | |
|---|---|---|---|---|
| JP | | 07 093 064 | 4/1995 | G06F/1/26 |
| JP | | 7-093 064 | 4/1995 | G06F/1/26 |
| JP | | 7-261 874 | 10/1995 | G06F/1/18 |

OTHER PUBLICATIONS

Compaq Computer Corporation, Phenix Technologies, LTD, and Intel Corporation, specification, 55 pages, May 5, 1995, "Plug & Play BIOS Specification.".

NetFRAME Systems Incorporated, *datasheet*, 2 pages, Feb. 1996, "NF450FT Network Mainframe."

NetFRAME Systems Incorporated, *datasheet*, 9 pages, Mar. 1996, "NetFRAME Cluster Server 8000."

Joint work by Intel Corporation, Compaq, Adaptec, Hewlett Packard, and Novell, *presentation*, 22 pages, Jun. 1996, "Intelligent I/O Architecture."

Lockareff, M., HTINews, http://www.hometoys.com/htinews/dec96/articles/lonworks.htm, 2 pages, Dec. 1996, "Loneworks—An Introduction."

Schofield, M.J., http://www.omegas.co.uk/CAN/canworks.htm, 4 pages, Copyright 1996, 1997, "Controller Area Network—How CAN works."

NTRR, Ltd, http://www.nrtt.demon.co.uk/cantech.html, 5 pages, May 28, 1997, "CAN: Technical Overview."

PCI Special Interest Group, specification, 35 pages, Draft For Review only, Jun. 15, 1997, "PCI Bus Hot Plug Specification."

Herr, et al., Linear Technology Magazine, *Design Features*, pp. 21–23, Jun. 1997, "Hot Swapping the PCI Bus"

Microsoft Corporation, file:///A|/Rem_devs.htm, 4 pages, Copyright 1997, updated Aug. 13, 1997, "Supporting Removable Devices Under Windows and Windows NT."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulliten, 92A+62947, pp. 391–394, Oct. 1992, Method for Card Hot Plug Detection and Control.

Lyons, Computer Reseller News, Issue 721, pp. 61–62, Feb. 3, 1997, "ACC Releases Low–Cost Solution for ISPs."

M2 Communications, M2 Presswire, 2 pp., Dec. 19, 1996, "Novell IntranetWare Supports Hot Pluggable PCI from NetFRAME."

Rigney, PC Magazine, 14(17): 375–379, Oct. 10, 1995, "The One for the Road (Mobile–aware capabilities in Windows 95)."

Shanley, and Anderson, PCI System Architecture, Third Edition, p. 382, Copyright 1995,.

ftp.cdrom.com/pub/os2/diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, http://www.netframe-support.com/technology/datasheets/data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

Davis, T, Usenet post to alt.msdos.programmer, Apr. 1997, "Re: How do I create an FDISK batch file?"

Davis, T., Usenet post to alt.msdos.batch, Apr. 1997, "Re: Need help with automating FDISK and FORMAT . . . "

NetFrame Systems Incorporated, Doc. No. 78–1000226–01, pp. 1–2, 5–8, 359–404 and 471–512, Apr. 1996, "NetFrame Clustered Multiprocessing Software: NW0496 DC–ROM for Novell® NetWare® 4.1 SMP; 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

Haban, D. & D. Wybranietz, *IEEE Transaction on Software Engineering*, 16(2):197–211, Feb. 1990, "A Hybrid Monitor for Behavior and Performance Analysis of Distributed Systems."

* cited by examiner

BRIDGE-ONLY

BRIDGE-ONLY

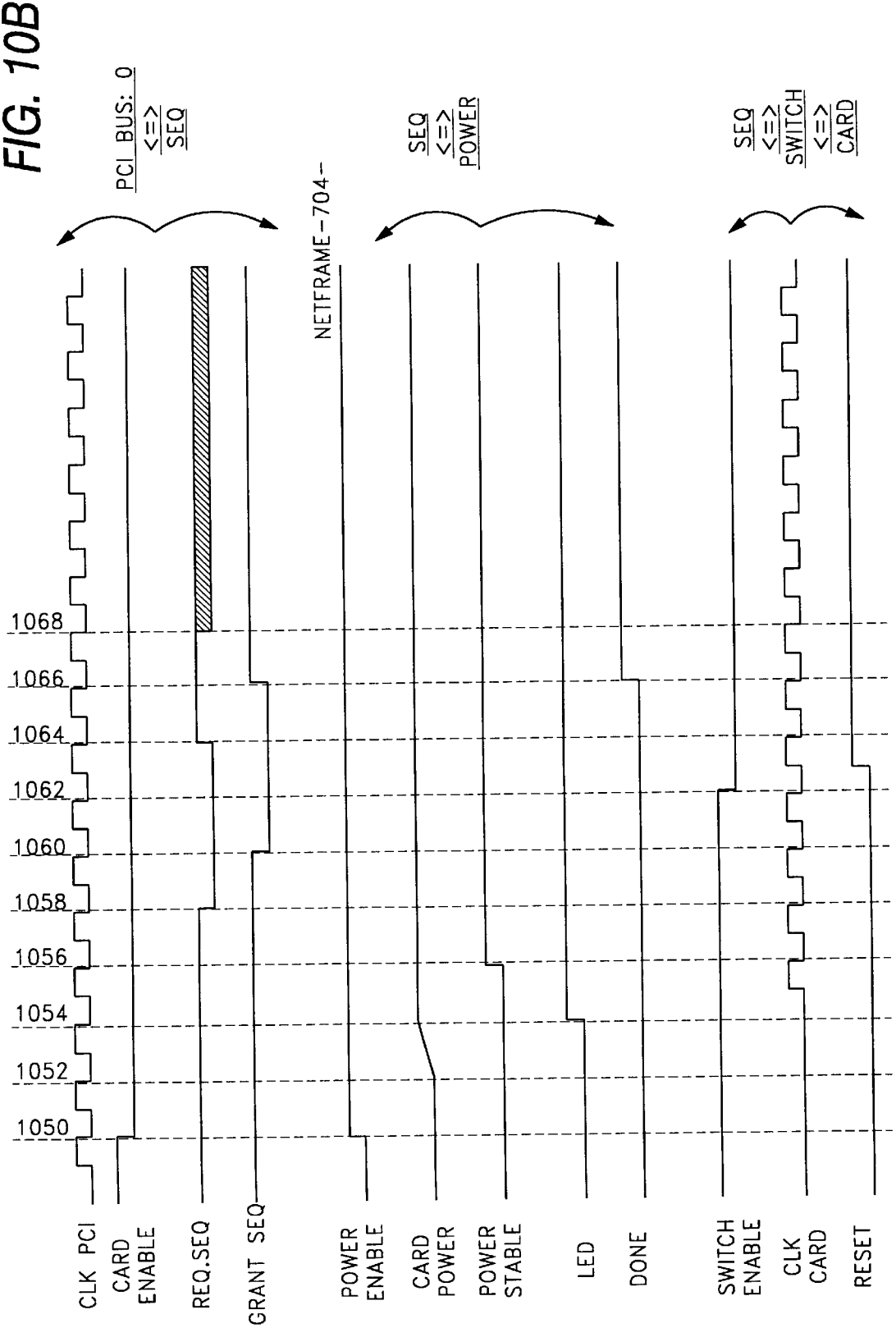

METHOD FOR COMPUTER IMPLEMENTED HOT-SWAP AND HOT-ADD

PRIORITY

The benefit under 35 U.S.C. § 119(e) of the following U.S. Provisional Application entitled "Computer System Hardware Infrastructure For Hot Plugging Single And Multi-Function PCI Cards Without Embedded Bridges," application Ser. No. 60/046,398, filed on May 13, 1997, and U.S. Provisional Application entitled "Computer System Hardware Infrastructure For Hot Plugging Multi-Function PCI Cards With Embedded Bridges," Application Ser. No. 60/046,312, filed on May 13, 1997, is hereby claimed.

RELATED APPLICATION

This application is related to U.S. application Ser. No.: 08/942,309, entitled "HOT ADD OF DEVICES SOFTWARE ARCHITECTURE"; U.S. application Ser. No.: 08/942,306, entitled "METHOD FOR THE HOT ADD OF DEVICES"; U.S. application Ser. No.: 08/942,331, entitled "HOT SWAP OF DEVICES SOFTWARE ARCHITECTURE"; U.S. application Ser. No.: 08/942,457, entitled "METHOD FOR THE HOT SWAP OF DEVICES"; U.S. application Ser. No.: 08/943,072, entitled "METHOD FOR THE HOT ADD OF A NETWORK ADAPTER ON A SYSTEM INCLUDING A DYNAMICALLY LOADED ADAPTER DRIVER"; U.S. Application Ser. No.: 08/942,069, entitled "METHOD FOR THE HOT ADD OF A MASS STORAGE ADAPTER ON A SYSTEM INCLUDING A STATICALLY LOADED ADAPTER DRIVER"; U.S. application Ser. No.: 08/942,465, entitled "METHOD FOR THE HOT ADD OF A NETWORK ADAPTER ON A SYSTEM INCLUDING A STATICALLY LOADED ADAPTER DRIVER"; U.S. application Ser. No.: 08/962,963, entitled "METHOD FOR THE HOT ADD OF A MASS STORAGE ADAPTER ON A SYSTEM INCLUDING A DYNAMICALLY LOADED ADAPTER DRIVER"; U.S. application Ser. No.: 08/943,078, entitled "METHOD FOR THE HOT SWAP OF A NETWORK ADAPTER ON A SYSTEM INCLUDING A DYNAMICALLY LOADED ADAPTER DRIVER"; U.S. application Ser. No.: 08/942,336, entitled "METHOD FOR THE HOT SWAP OF A MASS STORAGE ADAPTER ON A SYSTEM INCLUDING A STATICALLY LOADED ADAPTER DRIVER"; U.S. application Ser. No.: 08/942,459, entitled "METHOD FOR THE HOT SWAP OF A NETWORK ADAPTER ON A SYSTEM INCLUDING A STATICALLY LOADED ADAPTER DRIVER"; U.S. application Ser. No.: 08/942,458, entitled "METHOD FOR THE HOT SWAP OF A MASS STORAGE ADAPTER ON A SYSTEM INCLUDING A DYNAMICALLY LOADED ADAPTER DRIVER"; and U.S. application Ser. No.: 08/942,282, entitled "APPARATUS FOR COMPUTER IMPLEMENTED HOT-SWAP AND HOT-ADD", which are being filed concurrently herewith on Oct. 1, 1997.

APPENDICES

Appendix A, which forms a part of this disclosure, is a list of commonly owned copending U.S. Patent applications. Each one of the applications listed in Appendix A is hereby incorporated herein in its entirety by reference thereto.

Appendix B, which forms part of this disclosure, is a copy of the U. S. provisional patent application filed May 13, 1997, entitled "Computer System Hardware Infrastructure For Hot Plugging Single Multi-Function PCI Cards Without Embedded Bridges" and assigned Application Ser. No. 60/046,398.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The field of the present invention relates to a method for enhancing computer fault tolerance and reliability.

More particularly, the field of the invention relates to a method for adding hot-swap and hot-add functionality to a computer.

2. Background

From its origins in 1982 the personal computer (PC) has evolved into a multi-function machine suitable for use in either a stand alone or networked environment. The PCs configurablity as either a standalone or network device is due in part to the development of peripheral devices which can be easily added to a PC. Peripheral devices include for example: CD-ROM drive(s), hard disk(s), tape drive(s), monitor(s), printer(s), scanner(s), network interface cards (NICs) and serial component serial interface (SCSI) controllers.

Gone are the days when adding a single device to a computer required a time-consuming and technical process, to select a variety of system resources for each card by opening the computer and physically setting the jumpers and switches on the card. Now each peripheral device comes with plug and play capability which allows a new component to be added to a computer prior to power-up without having to perform any technical analysis or procedure.

Plug and Play (PnP) is an Intel standard for the design of PC peripheral device cards. PnP technology consists of hardware and software components that card, PC, and operating system manufacturers incorporate into their products. With this technology, the user is responsible for simply inserting the card into a corresponding expansion slot on the PC. Plug and Play makes the card capable of identifying itself and the resources it requires.

Implementing Plug and Play requires a basic input output system (BIOS) on the motherboard that supports Plug and Play as well as Plug and Play expansion cards. On power-up the system's software automatically sets up a suitable configuration for the card. Interrupt (IRQ) and direct memory access (DMA) settings and input/output (I/O) and memory addresses must be configured so that each device's I/O and memory functions occupy mutually-exclusive address ranges.

In order to accomplish this the system must be able to detect how many memory and I/O address ranges a device requires and the size of each. This information is included in a configuration register on each peripheral device. In addition, the system must have the capability of programming a device's address decoders in order to assign its I/O and memory non-conflicting ranges.

Peripheral devices are attached to a PC via a bus. For some time now, in PCs, in addition to the standardized industry standard architecture (ISA) bus for attachment of legacy devices such as keyboard and mouse, use has also been made of high speed Peripheral Component Interconnect (PCI) buses for attachment of peripheral devices.

The PCI bus supports PnP. The PCI bus is a local bus for personal computers that provides a high-speed data path between the microprocessor/memory systems and peripheral devices. PCI is processor independent and is available for PCs, PowerPCs and other microprocessors. The architecture is sanctioned by the PCI special interest group (SIG), supported by over 100 manufacturers. Its chief designer and promoter is Intel. The number of peripheral device controllers the bus can handle is based on loads, which have inductance, capacitance and other electrical characteristics. Normally there are 10 loads per bus. PCI compliant devices must be initialized and configured. PCI provides for totally software driven initialization and configuration via a separate configuration address space.

A PCI device is an electrical device connected to a PCI bus. A peripheral device is a device which is outside of (peripheral to) a computer syste, and typically is used in storing or transferring data to and from the computer. A device adapter is typically a PCI device, packaged on a printer circuit card and plugged into a card slot on a PCI bus, and is used to connect a peripheral device or devices to a computer system. Examples of adapter cards are network interface cards (NICs) which connect a computer to a computer network, and a SCSI Host Bus Adapter (HBA) which connects a computer to a small computer storage interface (SCSI) bus. Storage devices such as disks, cd-roms, and tapes and input/output (I/O) devices such as scanners and computer network interfaces are typically connected to a SCSI bus.

For standalone configurations of a PC plug and play offers sufficient functionality. Many PC's however, function as servers which are a vital component of a network providing for example: database, storage, print or other resources for the network. When a PC functions as a server, the requirement of PnP, that the computer be turned off to add a new component or repair and replace an existing component is not acceptable. In situations such as banking, airline reservations, or the stock exchange it costs a lot of time and money to bring down the network. In these networked environment a computers ability to overcome device failure is critical.

What is needed is a way to have a machine that continues to run even though a particular PCI device, such as a NIC or SCSI goes bad. What is needed is a machine that will allow the defective or outdated peripheral device to be replaced and placed back in service while the machine continues to run. What is needed is a machine in which new devices can be added and brought into service while the machine is running.

SUMMARY OF THE INVENTION

Apparatus and method is disclosed for providing hot-add and hot swap capability to a computer system with a processor, and a memory, connected to a system bus. The apparatus includes a first bus, an adapter card slot, a switchable interface unit and hot-swap hot-add program code means. The first bus is connected to the system bus. The adapter card slot has a first port and a second port. The switchable interface unit includes a primary port and a secondary port. The primary port is connected to the first bus and the secondary port is connected to the first port of the adapter card slot. The switchable interface unit is responsive to a hot-swap hot-add power-down request to disconnect the second port from the first bus. The switchable interface unit is also responsive to a power-up request to reconnect the second port to the first bus. The hot-swap hot-add program code means in the memory accepts a request to connect a peripheral device adapter card into the second port of said adapter card slot, and responsive to the request communicates a power-down request to the switchable interface unit.

BRIEF DESCRIPTION OF THE DRAWINGS

These and other features and advantages of the present invention will become more apparent to those skilled in the art from the following detailed description in conjunction with the appended drawings in which:

FIGS. 10A–B are signal diagrams for respectively power-down and power-up in a computer system utilizing sequencer and switch to support hot-add and hot-swap.

DESCRIPTION

Apparatus and method is disclosed for providing hot-add and hot swap capability to a computer system. The term hot-add refers to the placement of a peripheral device or card into an empty card slot of an operational computer system and the implementation of processes to bring that peripheral device into service. The term hot-swap refers to the substitution of an existing peripheral device or card that is running in a slot of a computer system with another peripheral device or card in the same slot, and the implementation of processes to bring that peripheral device into service.

HARDWARE

Sequencer and Switch Architecture

Figure 1:
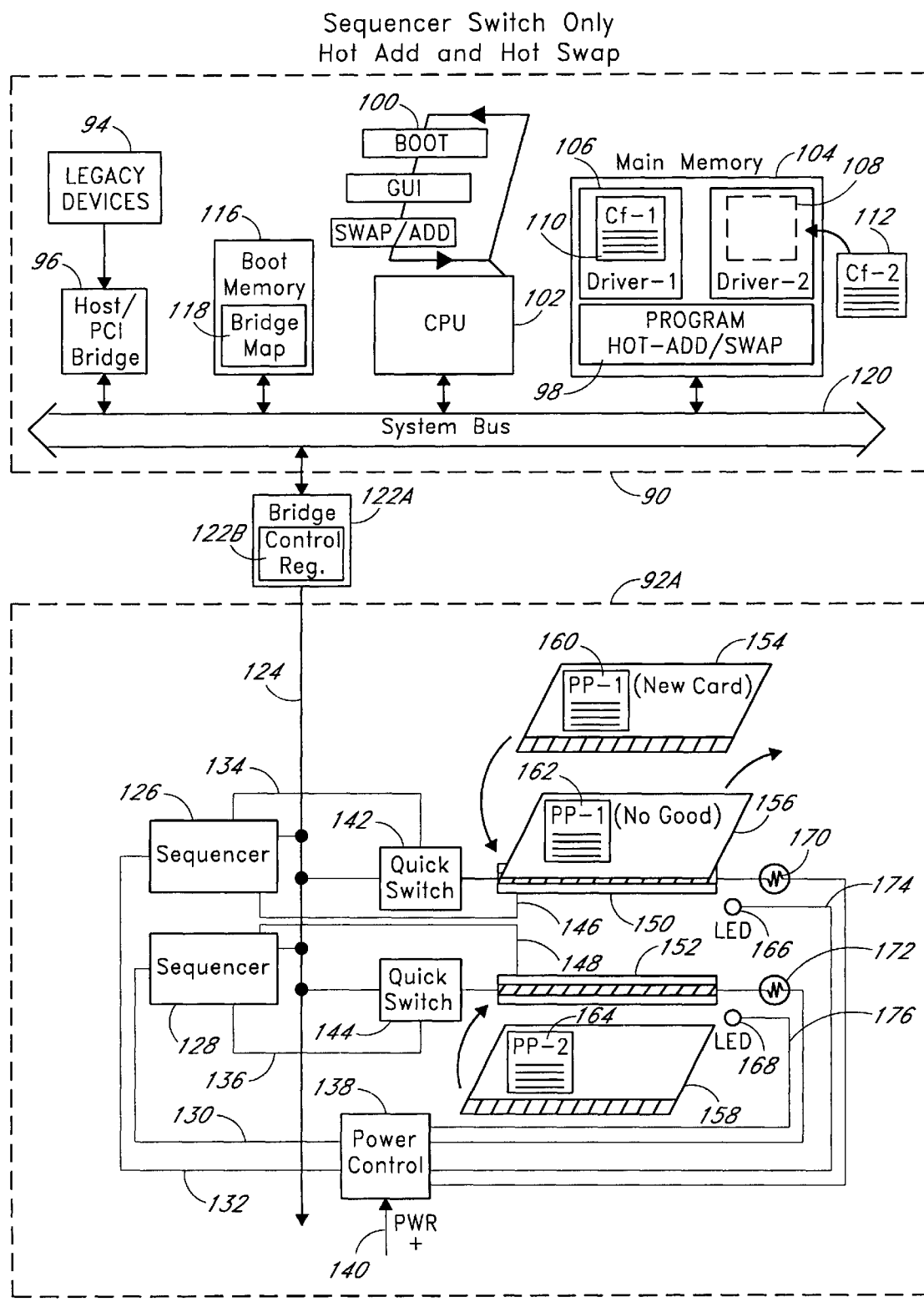
FIG. 1 is a hardware block diagram of a computer system with a sequencer and switch which support hot-add and hot-swap.

FIG. 1 is a hardware block diagram of a computer system utilizing sequencer and quick switch hardware to support hot-add and hot-swap. The system includes control unit 90, bridge and configuration register 122A–B and swap/add unit 92A. Control unit 90 includes main memory 104, microprocessor 102, boot memory 116, bridge 96 and legacy devices 94. Main memory 104 includes executable program code for customized device drivers 106–108 and program code 98 for hot-add and hot-swap software processes 100. Driver 106 includes configuration remapping 110 for a corresponding peripheral device 156. Driver 108 is not, in the example shown, yet associated with configuration remap 112 of a corresponding peripheral device 158, because that device has not yet been plugged into the expansion slot 152. Boot Memory 116 includes sparse bridge map 118.

Main memory 104, microprocessor 102, boot memory 116 and bridge 96 are all connected to system 120. The microprocessor may be conventional general purpose, single or multi-chip microprocessors such as the Pentium® processor, a Pentium® Pro-processor, a Power PC processor, or an Alpha® processor. In addition the microprocessor may be any conventional special purpose microprocessor such as a digital signal processor or a graphics processor. Legacy devices 94 are connected to bridge 96 via an industry standard architecture (ISA) bus. Legacy devices 94 include, for example: a keyboard and a mouse.

The bridge and configuration register 122A–B connects the system bus 120 of the control unit 90 to the swap/add unit 92A. The swap/add unit includes sequencers 126–128, quick switches 142–144, power control 138, card slots 150–152, adapter cards 154–158 and light emitting diodes (LEDs) 166–168. Adapter Cards 154–158 each include, respectively, configuration units 160–164.

Bridge and configuration register 122A–B are connected to bus 124. In an embodiment of the current invention bus 124 may implement the peripheral component interface (PCI) specification. Sequencers 126–128 and quick switches 142–144 are each connected directly to bus 124. Sequencer 126 is connected via control line 134 to quick switch 142. Sequencer 128 is connected via control line 136 to quick switch 144. Quick switches 142–144 are connected to, respectively, cards slots 150–152. Reset line 146 connects sequencer 126 to card slot 150. Reset line 148 connects sequencer 128 to card slot 152. Sequencers 126–128 are connected to power control 138 via, respectively, signal lines 132–130. Power control 138 is connected to power supply lines 140. Power control is connected to light emitting diodes (LEDs) 166–168 via respectively signal lines 174–176. Power control supplies power to each of card slots 150–152 via respectively, power lines 170–172. Each of adapter cards 154–158 is fabricated on a card. Each card is suitable for connecting to either of card slots 150–152. Adapter cards 154–158 include, for example, adapters to connect CD-ROM drive(s), hard disk(s), tape drive(s), monitor(s), printer(s), scanner(s), network interface cards (NICs) and small computer storage interface (SCSI) controllers.

In operation, microprocessor 102 implements processes 100 during both boot initialization and run-time for the computer system. The boot initialization processes shall be identified as sparse bridge mapping and shall be described in greater detail in conjunction with FIGS. 4–5. The run-time software processes include hot-add and hot-swap. The runtime processes of hot-swapping and hot-adding are described in detail in the following FIGS. 8–9.

Sequencer Hot-Swap

From a hardware perspective an example of hot-swapping is shown in FIG. 1, by reference to peripheral devices 154–156. Initially peripheral device card 156 is operational within card slot 150. The hot-swap shown, can be initiated for a number of reasons including: device failure, device upgrade, and preventive maintenance. Failure detection is accomplished by hardware or software, and is assumed to have occurred. A description of processes for failure detection is found in others of the related applications in Appendix A. The sequence of events involved in hot-swap can be instigated by a human operator through user interfaces and associated software, or automatically by system management software.

In an embodiment of the invention, resident processes 100 include failure detection processes for detecting a failure of a peripheral device and notifying the user.

In response to a hot-swap request which may be machine or user generated resident processes 100 initiate the hot-swap sequence on a selected card slot, e.g. card slot 150, by quiescing driver 106 which is associated with the slot 150 to be powered-down. Resident processes then send a "power-down" command to the sequencer 126. The "power-down" command originates from processor 102 operating under the control of program code for hot-swap and hot-add 98. In an embodiment the "power-down" command is passed from the CPU 102 to the sequencer 126 via the PCI bus 124. In another embodiment the "power-down" command is passed to the sequencer via an alternate signal control path not shown. This alternate path could include a programmable array logic (PAL) attached to the same bus 96 to which the legacy devices 94 are attached. In that embodiment resident processes 100 would enable the sequencer by sending a "power-down" command through bridge 96 to the PAL which, in turn, would activate the sequencer associated with the card slot subject to the hot-add or hot-swap. In either embodiment, once the sequencer receives the "power-down" command, the sequencer controls the quick switch 142, the reset line 146, and the power control 138. This hand-off from resident processes 100 to the sequencer 126 is critical because the power-down of the peripheral device 156 needs to be synchronized with the clock cycles on the bus 124. The sequencer can implement this precise timing.

The sequencer negotiates for control of the PCI bus with what is known as the PCI bus arbiter. Each sequencer can master the PCI bus by sending a REQ# signal to the arbiter and receiving a GNT# in response. Each master is connected to the arbiter via a separate pair of REQ#/GNT# signals. Typically the arbiter is integrated into the host/PCI or the PCI/expansion bus bridge chip. Each sequencer controls the REQ# line for its corresponding card slot and only releases that control to the peripheral device in the card slot when that device is operating normally. The sequencer causes the quick switch 142 to disconnect card slot 150 from bus 124 and activates the reset line 146, placing the card in reset. When asserted the reset signal forces the configuration registers of the configuration unit 162 to an initialized state. The sequencer sends the power-down command to the power control 138. The power control in response removes power from the slot 150 and LED 166. The power control monitors power-down and when power has been removed from the slot sends a "Done" signal to the sequencer.

When the "Done" signal is received by the sequencer the sequencer either notifies the resident processes 100 and releases the bus or if it has already released the bus, reacquires control of the bus and notifies the resident processes 100 that the power-down is complete, and then re-releases the bus.

When the user detects that LED 166 is an off condition, the user removes the faulty adapter card 156 from card slot 150 and replaces it with a new adapter card 154. In one embodiment of the current invention, a human operator initiates a power-up sequence through a user interface similar to that shown in FIG. 11H. In another embodiment hardware and software automatically detect the replacement of an adapter card and responsive thereto initiate the power-up sequence. In an embodiment of the current invention detection of a replacement or new card results from initialization communications initiated between the adaptor card and the resident processes 100.

In response to a replacement adapter card being installed, resident processes 100 instruct sequencer 126 to initiate the connection of peripheral device 154 to bus 124. The sequencer then implements logic to power up the card. The sequencer places the card in reset and sends a power-up command to the power control 138. The power control in response, supplies power to card slot 150, energizes LED 166 and confirms stable power by sending a "power-stable" command to the sequencer. When the sequencer receives the "power-stable" command the sequencer negotiates for the bus by asserting a REQ# signal. When the sequencer detects a GNT# signal the sequencer enables the quick switch 142 to connect card slot 150 to bus 124. The power control monitors power-up and when power has been provided to the slot sends a "Done" signal to the sequencer.

When the "Done" signal is received by the sequencer the sequencer either notifies the resident processes 100 and releases the bus or if it has already released the bus, reacquires control of the bus and notifies the resident processes 100 that the power-down is complete, and then re-releases the bus. After power-up the peripheral device 154 is given control of the REQ# line. Then the software adapter driver 106 is restarted by the resident processes 100. In one embodiment a human operator initiates a restart of the adapter card through a user interface, in another embodiment the system software automatically initiates restart of the adapter. When the "restart" command is detected by resident processes 100 the configuration registers 160 of the adapter card 154 are configured with the run-time configuration 110 stored in main memory 104. Further details of Hot-swap processes in a sequencer and quick-switch architecture will be set forth in FIGS. 8–10.

Sequencer Hot-Add

From a hardware perspective an example of hot-adding is shown in FIG. 1, by reference to peripheral device 158. These processes closely resemble those discussed above with respect to a hot-swap, with the exception of an additional required step of determining a suitable configuration for the new peripheral device. Card slot 152 is initially empty and at some point during the operation of the computer system a user implements processes for adding an adapter card, i.e., card 158 to card slot 152. The user indicates, through a system management software application or command line utility, the desire to add a new adapter card to a particular slot 152. In one embodiment, resident processes indicate to the operator which card slots are available and should be utilized for a new adapter. Resident processes 100 then notify the sequencer, e.g. sequencer 128, that it should initiate a hot-add. The "power-down" command is passed to the sequencer via bus 124, or an alternate route such as that discussed above in connection with a hot-swap.

The sequencer causes the quick switch 144 to disconnect card slot 152 from bus 124 and activates the reset line 148, placing the card slot in reset. The sequencer sends the power-down command to the power control 138. The power control in response removes power from the slot 152 and LED 168. The power control monitors power-down and when power has been removed from the slot sends a "Done" signal to the sequencer.

When the "Done" signal is received by the sequencer, the sequencer either notifies the resident processes 100 and releases the bus or if it has already released the bus, reacquires control of the bus and notifies the resident processes 100 that the power-down is complete, and then re-releases the bus.

When the human operator detects that LED 168 is an off condition, the user adds new adapter card 158 to card slot 152. Resident processes 100 detect the hot-add, either automatically or via a user input, and responsive thereto instruct sequencer 126 to initiate the connection of peripheral device 158 to bus 124. The sequencer then implements logic to power-up the card. The sequencer places the card in reset and sends a power-up command to the power control 138. The power control in response, supplies power to card slot 152, energizes LED 168 and confirms stable power by sending a "power-stable" command to the sequencer. When the sequencer receives the "power-stable" command the sequencer negotiates for the bus by asserting a REQ# signal. When the sequencer detects a GNT# signal the sequencer enables the quick switch 144 to connect card slot 152 to bus 124. The power control monitors power-up and when power has been provided to the slot sends a "Done" signal to the sequencer.

When the "Done" signal is received by the sequencer the sequencer either notifies the resident processes 100 and releases the bus or if it has already released the bus, reacquires control of the bus and notifies the resident processes 100 that the power-down is complete, and then re-releases the bus. After power-up the peripheral device 154 is given control of the REQ# line. In one embodiment the resident processes configure the configuration register 164 of the adapter card 158 with a suitable configuration considering both the requirements of the device as well as the free resources of the system. The configuration 112 is stored in main memory 104. If such a configuration is not possible, i.e. resources which the card requires are not available, then the user is notified. Further details of hot-swap processes in a sequencer and quick-switch architecture will be set forth in FIGS. 9A–B.

Figure 2:
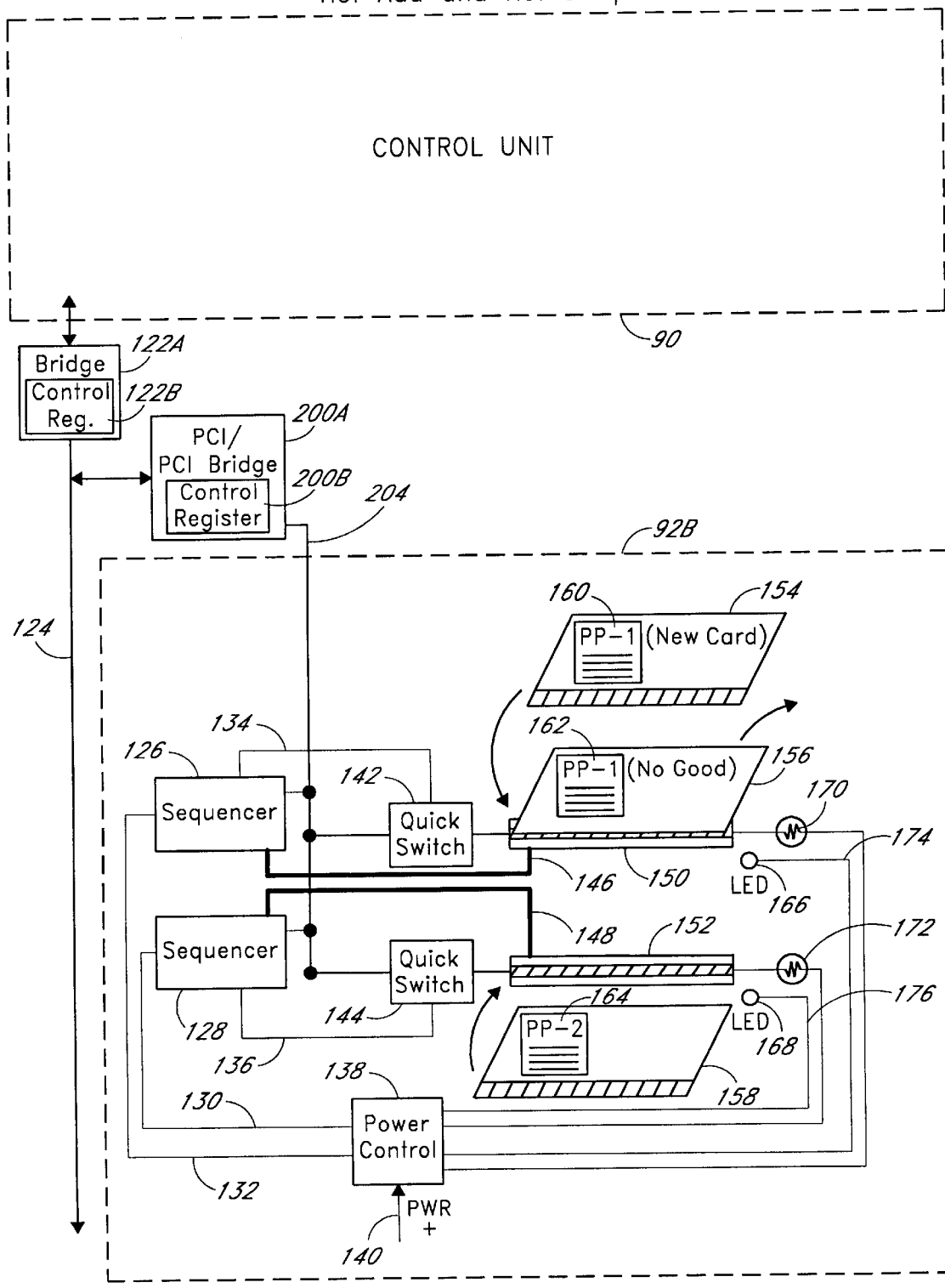
FIG. 2 is a hardware block diagram of a computer system with a bridge sequencer and switch which support hot-add and hot-swap.

FIG. 2 is an alternate embodiment of the sequencer and quick-switch architecture of FIG. 1 implemented on a secondary bus. Control unit 90, bridges 122A, 200A and swap/add unit 92B are shown. Control unit 90 includes that same devices and structural connections as discussed above in FIG. 1. Bridge 122A includes configuration register 122B. Bridge 200A includes configuration register 200B. Swap/Add unit contains the same circuitry discussed above in connection with swap/add unit 92A shown in FIG. 1. The circuitry is, however, attached to subordinate bus 204 instead of the primary bus 124. Control unit 90 is connected to bus 124 via bridge 122A. Bus 124 is connected to a subordinate bus 204 via bridge 200A.

The swap/add unit includes sequencers 126–128, quick switches 142–144, power control 138, card slots 150–152, adapter cards 154–158 and light emitting diodes (LEDs) 166–168. Adapter cards 154–158 include, respectively, configuration units 160–164.

In an embodiment of the current invention buses 204 and 124 may implement the peripheral component interface (PCI) specification and bridge 200A is a PCI-to-PCI bridge. Sequencers 126–128 and quick switches 142–144 are each connected directly to bus 204. Sequencer 126 is connected via control line 134 to quick switch 142. Sequencer 128 is connected via control line 136 to quick switch 144. Quick switches 142–144 are connected to, respectively, cards slots 150–152. Reset line 146 connects sequencer 126 to card slot 150. Reset line 148 connects sequencer 128 to card slot 152. Sequencers 126–128 are connected to power control 138 via, respectively, signal lines 132–130. Power control 138 is connected to power supply lines 140. Power control is connected to light emitting diodes (LEDs) 166–168 via respectively signal lines 174–176. Power control supplies power to each of card slots 150–152 via respectively, power lines 170–172. Each of adapter cards 154–158 is suitable for connecting to either of card slots 150–152. Two card slots 150–152 can be utilized to provide hot-swap and hot-add capability to the computer system.

"Power-down" and Power-up" commands to control hot-swap and hot-add are passed from the control unit to sequencers 126 and 128 along secondary bus 204. These commands may also be passed via alternate routes such as those discussed above in connection with FIG. 1. Similarly, "done" confirmations from either of sequencers 126 and 128 are sent via secondary bus 204 to control unit 90.

The sequencer/switch architecture discussed above in connection with FIGS. 1–2 can, in an alternate embodiment, be utilized to provide swap/add capability to a canister comprised of multiple card slots. All the slots of a canister are powered-up and down collectively and there will be one sequencer for the canister and a quick switch for each of the card slots within the canister.

Bridge Only Architecture

Figure 3:
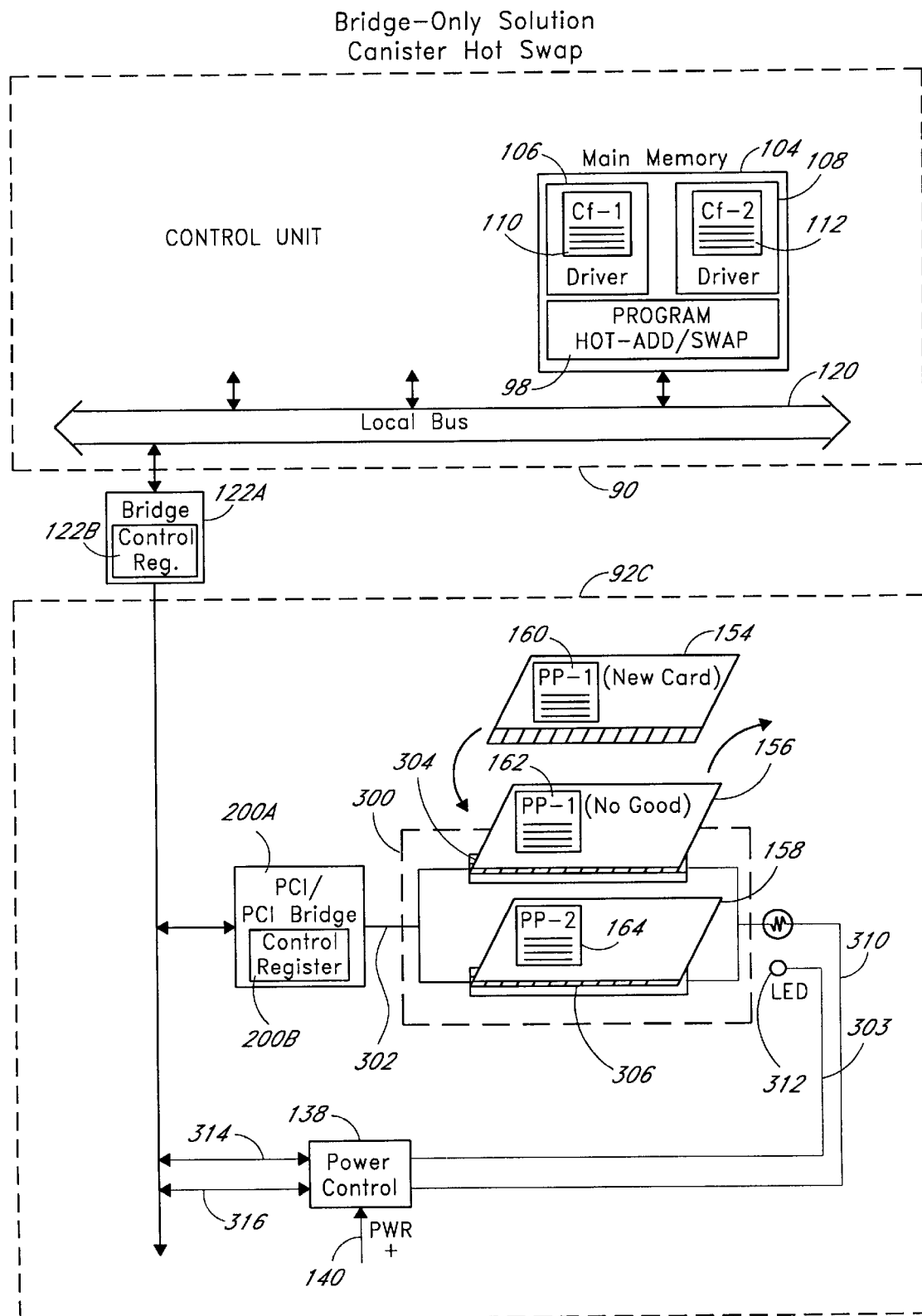
FIG. 3 is a hardware block diagram of computer system with a bridge which supports hot-add and hot-swap.

FIG. 3 shows a bridge only solution for implementing a hot-swap or hot-add. The bridge may be connected to a single slot, or as in the example shown, to a canister with multiple slots. FIG. 3 shows a control unit 90, bridge 122A and hot-swap/add unit 92C. Main memory 104 includes device drivers 106, 108 and program code 98 for hot-add and hot-swap. Each of device drivers 106 and 108 includes a corresponding peripheral device re-map respectively, maps 110–112. Bridge 122A includes a configuration register 122B. Hot-Swap/Add unit 92C includes bridge 200A, canister 300, power control 138, peripheral devices 154–158 and LED 312. The hot-swap/add unit 92C is identified as a bridge-only configuration because there is no sequencer quick switch combination. Canister 300 includes card slots 304 and 306. Each of peripheral devices 154–158 include respectively configuration logic 160–164. Both bridges 122A and 200A include, respectively, configuration registers 122B and 200B.

Control unit 90 is connected via bridge 122A to bus 124. Each of the card slots 304–306 of canister 300 is connected via secondary bus 302 to bridge 200A. In an embodiment secondary bus 302 and primary bus 124 are implemented as PCI busses. Bridge 200A connects to bus 124. Power control 138 connects to bus 124 via signal lines 314, 316. Power control 138 receives power via power lines 140. Power control 138 is connected to LED 312 via signal line 303. The power control is also connected via power lines 310 to both of the card slots 304–306 within canister 300.

Bridge-Only Hot-Swap

From a hardware perspective, a hot-swap in the bridge-only architecture is initialized by the resident processes 100 cause the drivers associated with the specific canister to be powered down to quiesce. Then the resident processes issue a "disconnect" command is passed to the bridge 200A causing the bridge to disconnect secondary bus 302 from primary bus 124, thereby isolating the canister 300 and associated card slots. This isolation prevents the transient conditions on the bus 302 from propagating back to bus 124 and affecting the integrity of other, unrelated operations. The command takes the form of a specific bit written by control processes 100 to the configuration register 200B. When this bit is in the appropriate logic state bridge 200A disconnects the canister 300 from the bus 124. Resident processes 100 then communicate with power control 138 by sending a "power-down" command to the power control. In response the power control disconnects power from each of the card slots 304–306 of canister 300. Additionally, LED 312 is extinguished by power control 138. This notifies the user that power down is complete and that adaptor card replacement is appropriate.

When the user has replaced faulty device 156 with new peripheral device 154 it is appropriate for the user to then initiate a peripheral device power-up. The user selects a power-up button on a GUI such as that shown in FIG. 12G. The selection is detected by resident processes 100 as a "power-up" command directed specifically to bridge 200A. In response the resident processes send a "power-up" command to power control 138 to resupply power to each of the card slots 304–306 of canister 300. The power control resupplys power to the canister, enables the LED 312 and monitors power for a stable condition. When power is stable the power control sends a "Done" command to the resident processes. In response the resident processes 100 send a secondary bus "reconnect" command to flip a specific bit in the configuration register 200B of bridge 200A . This command causes the bridge to re-connect the canister 300 to the bus 124.

After physical reconnection of the peripheral devices within the canister to the bus 124 the control processes 100 communicate directly with the configuration units 162–164 of each of the peripheral devices 156–158. The result of this communication is that the control processes 100 cause each of the configuration units to reconfigure themselves according to the corresponding one of each of runtime re-configurations 110 and 112.

Bridge-Only Hot-Add

Figure 8A:
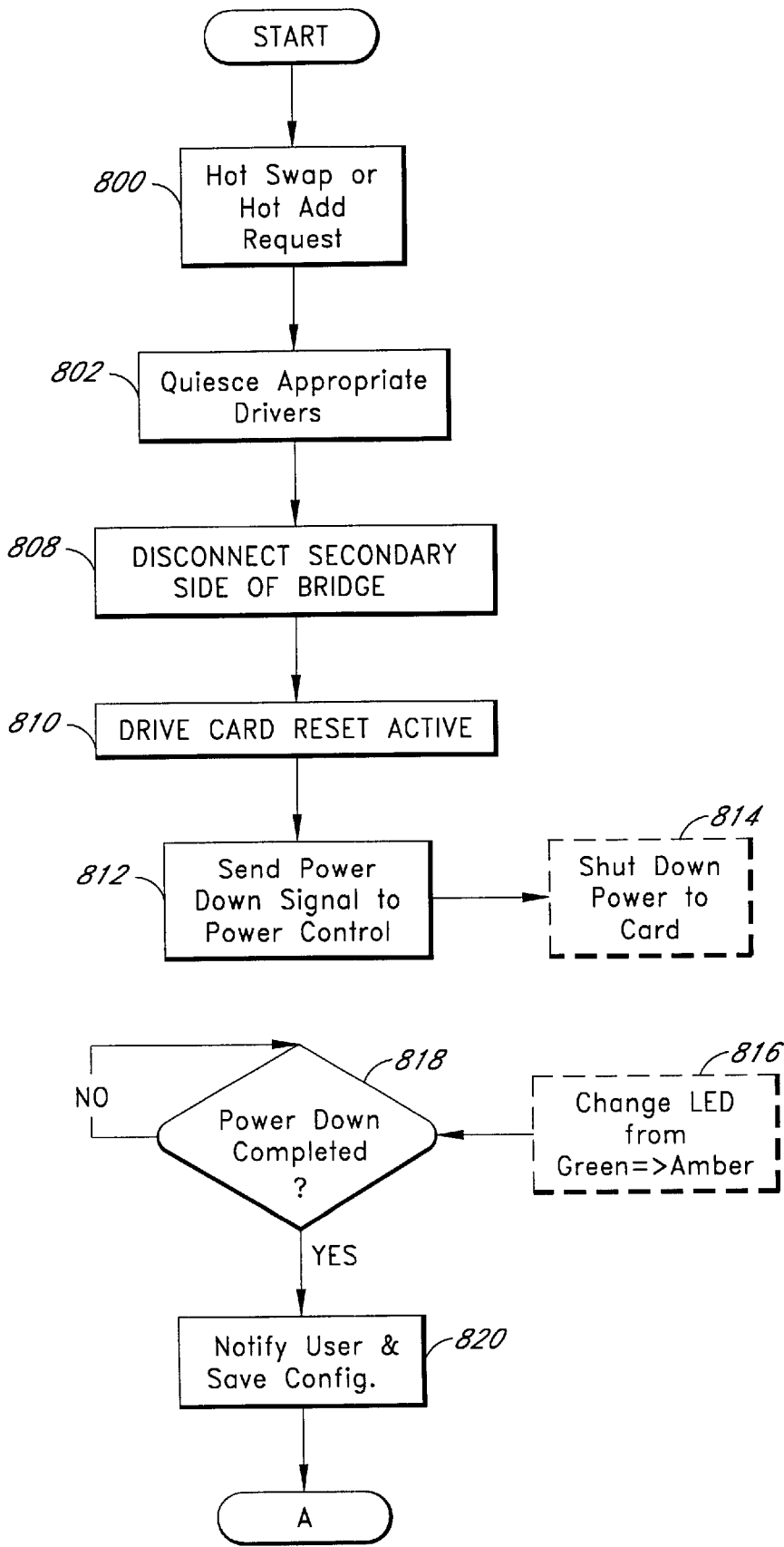
FIGS. 8A–B are process flow diagrams for hot-add and hot-swap in a computer system utilizing a bridge only architecture.
Figure 8B:
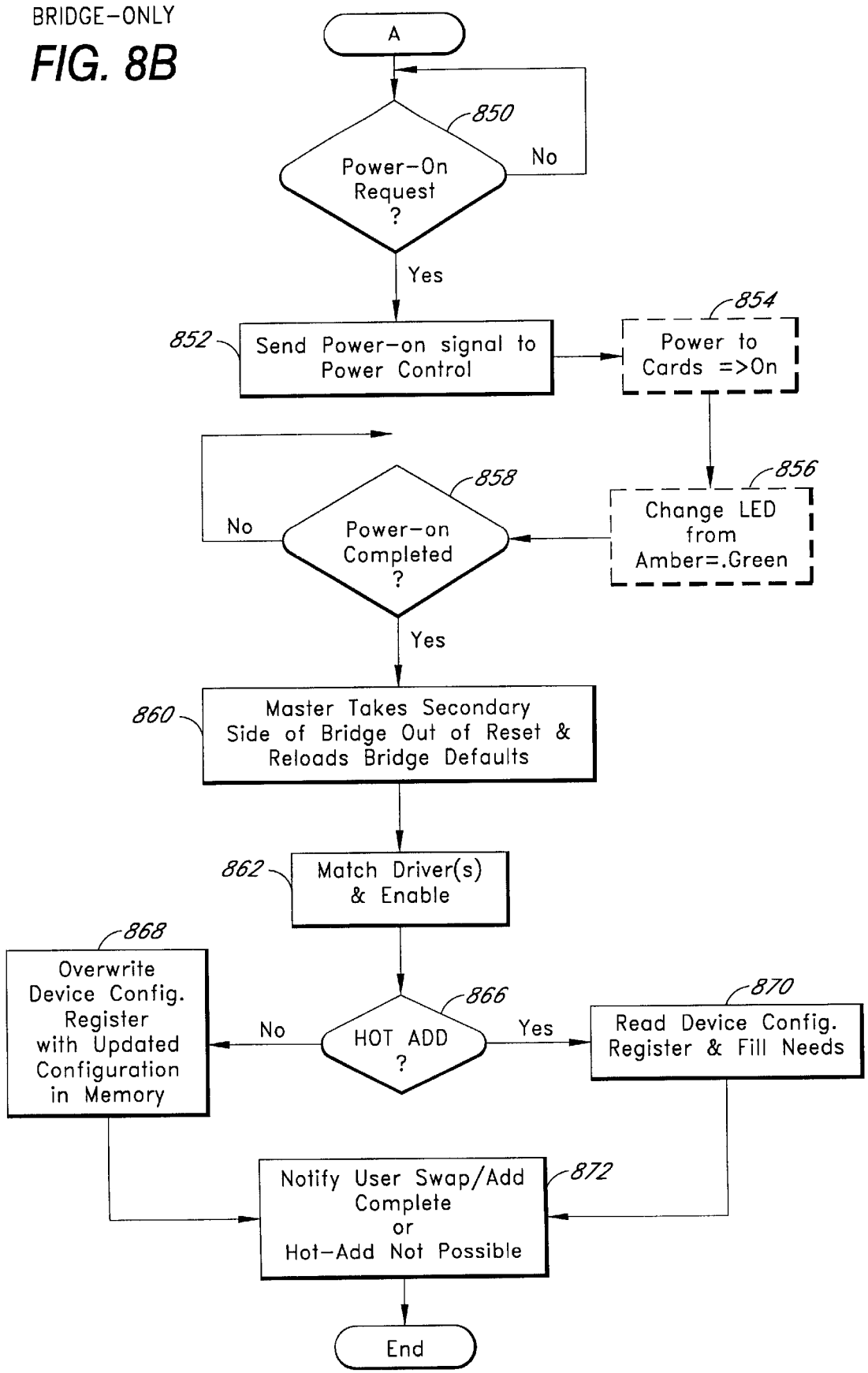

From a hardware perspective, a hot-add in the bridge-only architecture is implemented in a manner similar to that discussed above in connection with hot-swap. On power-down, however, there is no driver quiescence because there is no canister connected to the bridge, initially in a hot add. Alternately, if there is a canister, it does not contain peripheral devices. On power-up drivers have to be matched to the peripheral devices being added. If these drivers do not exist the user is so notified. Additionally, if the drivers do exist, but there are no resources available to allocate to the devices, the user is also notified. Further disclosure of the processes associated with a bridge only hot-add are shown in FIGS. 8A–B.

Sparse Bridge Mapping

As indicated in the discussion of Plug and Play, each adapter card must be configured. Normally, this configuration is done at boot time by the BIOS, insuring that no adapter card's assigned addresses encroach on those of another adapter card.

Figure 6A:
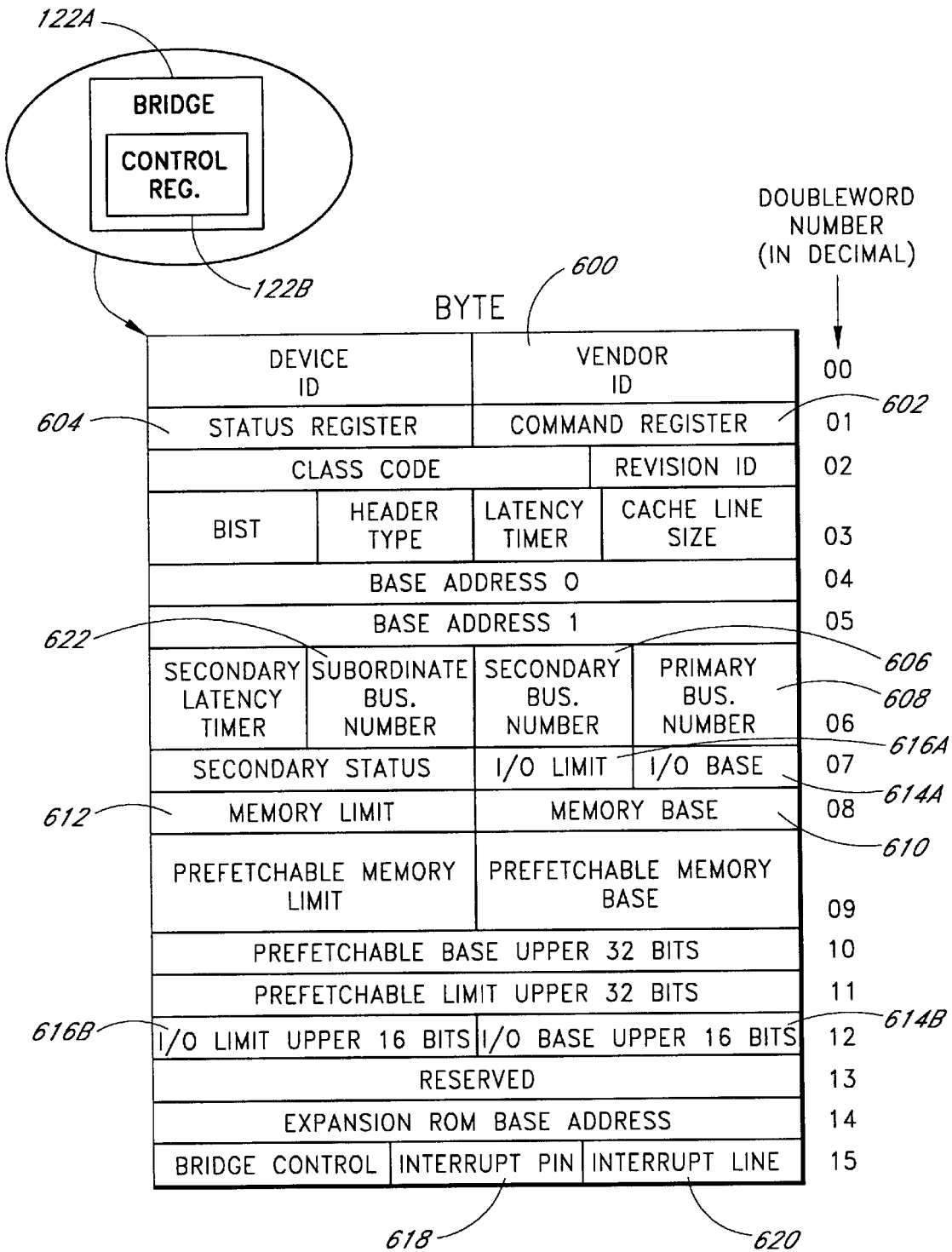
FIGS. 6A–B are configuration registers of respectively, a PCI-to-PCI bridge and a PCI compliant peripheral component.
Figure 6B:
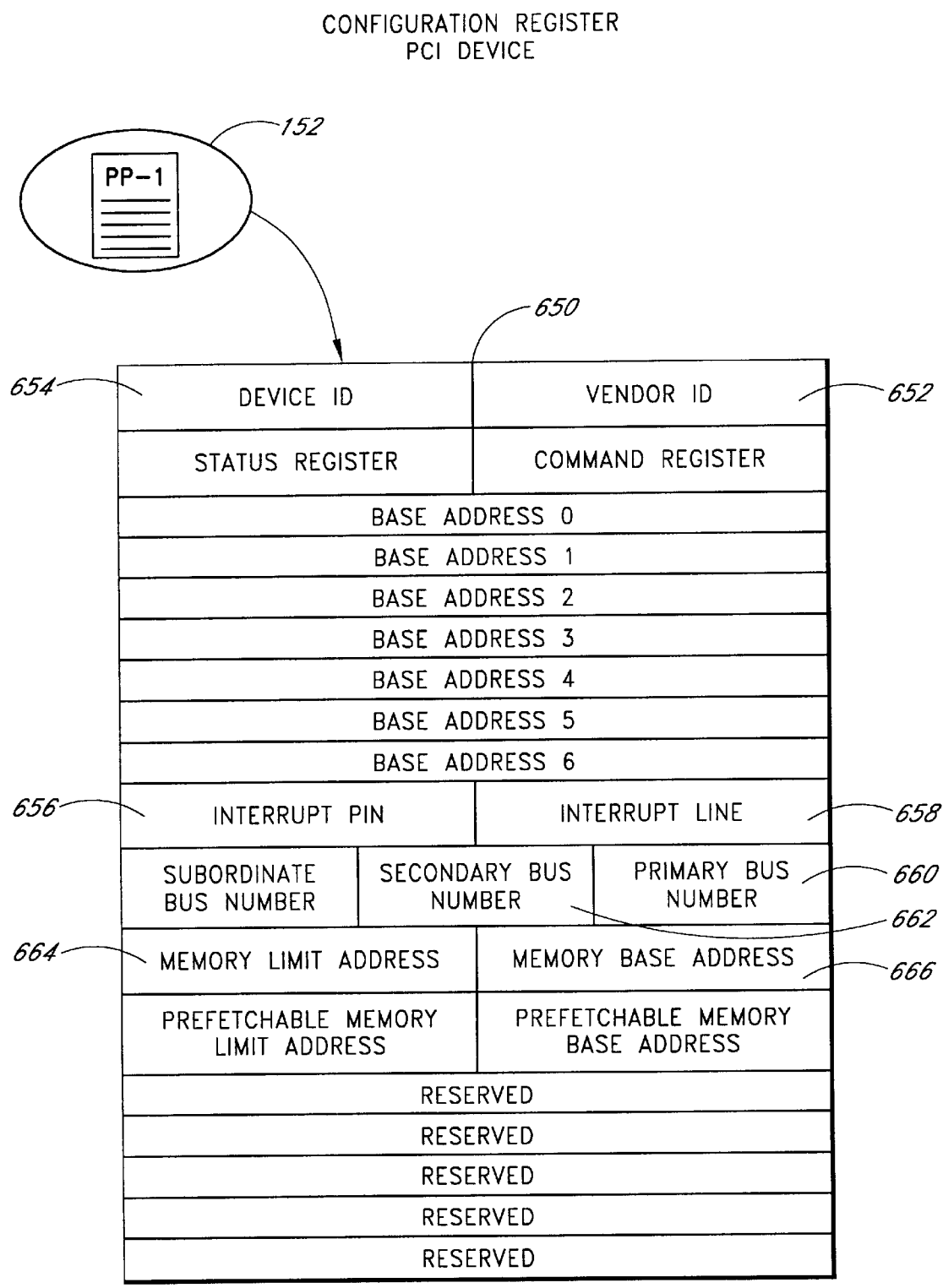

PCI defines three address spaces through which devices may communicate: memory space, I/O space and configuration space. Software normally communicates with PCI devices through registers and buffers programmed to respond to specific memory or I/O addresses. The third address space, configuration space, is used by specific system software, such as the BIOS at boot time, to program the memory or I/O addresses the PCI device's registers will respond to. The phrase "configuration of a PCI device" refers to this programming of the device through its configuration space. As was indicated earlier, the memory and I/O address spaces must be managed by the BIOS, and by other system software to properly program adapter cards following a hot swap or hot add operation. FIG. 6A illustrates the configuration space for a PCI-to-PCI bridge. FIG. 6B describes the configuration space of a PCI device.

Under PCI, PCI-to-PCI bridges each define trees of subordinate busses. Each bus receives a bus number, Primary Bus Number (608), and each bridge defines the range of bus numbers implemented below it in the tree. The Secondary Bus Number 606 is the bus number of the PCI bus on the other side of the bridge, and the Maximum Subordinate Bus Number 622 is the largest PCI bus number found within the tree below this bridge. This implies that the bus number space is allocated among the bridges such that all buses accessible through a bridge are contiguously numbered, and that the bus number ranges allocated among peer bridges are disjoint.

Each PCI bridge also has two pairs of address registers which define the ranges of memory and I/O addresses (respectively) which this bridge will pass through to subordinate buses. The Memory Base (610) and Memory Limit (612) define the range of memory addresses, and the I/O Limit Upper 16 Bits and I/O Base Upper 16 Bits define a range of I/O addresses. PCI devices attached to the bridge's secondary bus, or to buses subordinate to the secondary bus are assigned memory and I/O address ranges from these two ranges.

A computer implementing sparse bridge mapping can support realtime hot-add capabilities.

In FIGS. 6A–B the configuration registers for respectively, a PCI-to-PCI bridge and for a peripheral device are shown. The configuration register contains the resource requirements for the device and default settings for the device, i.e.

Interrupt (IRQ) and direct memory access (DMA) settings and input/output (I/O) and memory addresses. All devices in a PCI environment are individually addressable and are allocated specific unique ranges in which the addressing can be accomplished. In order for each device to be configured so that its I/O and memory functions occupy mutually-exclusive address ranges, each devices configuration register also includes means for resetting the default configuration values.

In a PC environment, I/O space is densely populated and will only become more so in the future. For this reason and because some processors are only capable of performing memory transactions, the PCI specification strongly recommends that the device designer provide a memory base address register to map a device's register set into memory space. Optionally, an I/O base address register may also be included. This gives the configuration software the flexibility to map the device's register set at least into memory space and, if an I/O base address register is also provided, into I/O space as well. The device driver associated with the device can choose whether to communicate with its device's register set through memory or I/O space.

Intel x86 and PowerPC™ 60x processors possess the ability to address two distinct address spaces: I/O and memory. PCI bus masters (including the host/PCI bridge) use PCI I/O and memory transactions to access PCI I/O and memory devices, respectively. In addition, a third access type, the configuration access, is used to access a device's configuration registers. A device's configuration registers must be initialized at startup time to configure the device to respond to memory and/or I/O address ranges assigned to it by the configuration software.

On a PCI bus there are two types of configuration registers. Configuration registers with a header type one includes PCI-to-PCI bridges, and the second type of configuration registers associated with header type zero is applicable to all other PCI devices.

The first type of configuration register associated with PCI-to-PCI bridges is shown in FIG. 6A. The bridge functions as a traffic coordinator between two PCI buses. Its job is to monitor each transaction that is initiated on the two PCI buses and decide whether or not to pass the transaction through to the opposite PCI bus. When the bridge determines that a transaction on one bus needs to be passed to the other bus, the bridge must act as the target of the transaction on the originating bus and as the initiator of the new transaction on the destination bus. The fact that the bridge resides between the transaction initiator and the target is invisible to the initiator [as well as to the target].

The PCI-to-PCI bridge configuration register 600 includes a vendor ID and a device ID register. The configuration register also includes registers for: the primary bus number 608, the secondary bus number 606, the memory base address 610, the memory limit 612, the IO base address 614, the I/O limit 616, the interrupt pin 618 and the interrupt line 620. A command register 602 provides the basic ability to control the devices response to and/or performance of PCI accesses. A status register 604 allows for tracking of the status of PCI bus-related events. This register can be read from but writes are handled differently than the norm. On a write bits are cleared but not set. A bit is cleared by writing a 1 to it. This method was selected to simplify the programmer's job. After the reading the state and ascertaining the error bits that are set, the programmer clears the bits by writing the value that was read back to the register. Utilizing the command register, the default configuration for each PCI device can be remapped to accommodate various system architectures.

In operation the primary bus number register is initialized by software with the number of the bridge's bus that is closer to the host processor. The secondary bus number register is initialized by software with the number of the bridge's bus that is further from the host processor. The subordinate bus number register is initialized by software with the number of the highest numbered bus that exists behind the bridge. The configuration register also includes address decode related registers. The devices that reside behind a PCI-to-PCI bridge may consist of only memory, only I/O, or a combination of memory and I/O devices. Furthermore, some of the I/O devices may be mapped into memory space while others are mapped into I/O space. The configuration program automatically detects the presence, type and address space requirements of these devices and allocates space to them by programming their address decoders to recognize the address ranges it assigns to them. The speculative mapping program contained in boot memory assigns all I/O devices that either physically or speculatively reside behind a PCI-to-PCI bridge mutually-exclusive address ranges within a common overall range of I/O locations. The PCI-to-PCI bridge is then programmed to pass any I/O transactions detected on the primary site of the bridge to the secondary side if the target address is within the assigned range. Conversely, any I/O transactions detected on the secondary side of the bridge are passed to the primary side if the target address is outside the range associated with the community of I/O devices that reside on the secondary side.

Similar considerations apply for memory mapped I/O devices and for memory devices.

The second type of configuration register associated with peripheral devices is shown in FIG. 6B. The peripheral device configuration register 650 includes a vendor ID and a device ID register. The configuration register also includes registers for: the interrupt pin 656, the interrupt line 658, the primary bus number 660, the secondary bus number 662, the memory base address 666 and the memory limit 664. A command register 652 provides the basic ability to control the devices response to and/or performance of PCI accesses. A status register 654 allows for tracking of the status of PCI bus-related events. Utilizing the command register, the default configuration for each PCI device can be remapped to accommodate various system architectures.

In operation the hot-swap code stores remap configurations 110–112 [see FIG. 1] in the main memory. When a new replacement card is first added to the system the configuration registers of the device contains a default configuration. The Hot-swap program code utilizes remap configurations stored in main memory to reprogram the configuration registers of the swapped peripheral device, with the remap configuration values assigned to its predecessor and stored in main memory.

Figure 7A:
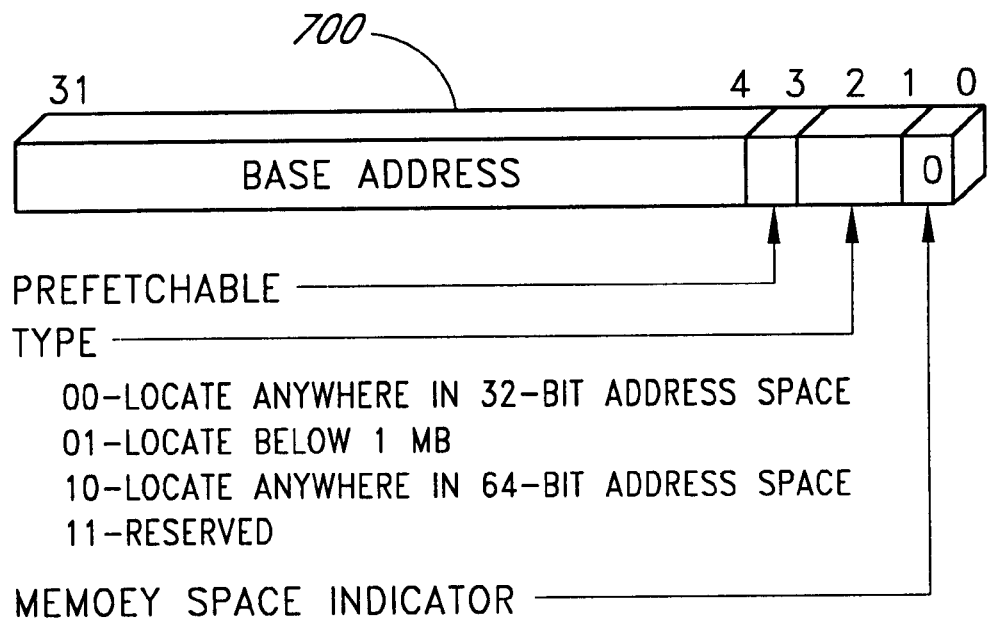
FIGS. 7A–B show the base address registers for respectively memory mapped and IO mapped command registers of a PCI configuration register.
Figure 7B:
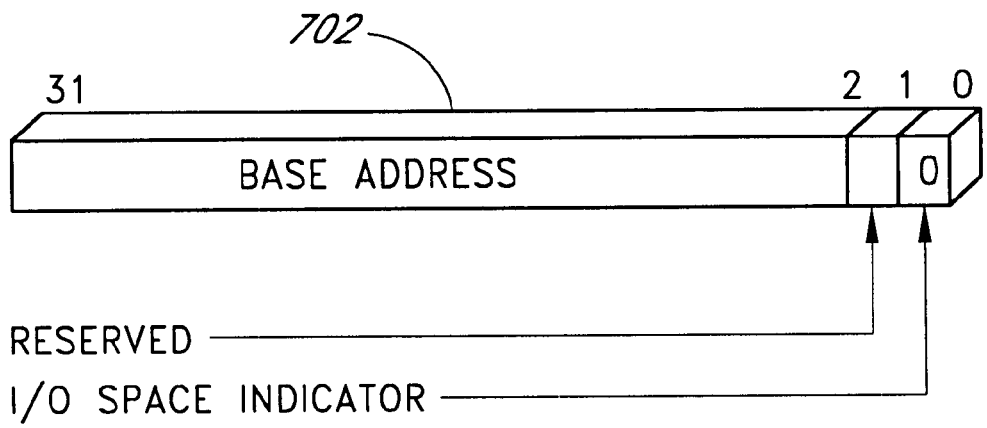

FIGS. 7A–B illustrate the two possible formats of base address configuration register as respectively, a memory address decoder 700 and an I/O address decoder 702. When the configuration programmer probes a base address register, he or she is attempting to discover the following:

Is the base address register implemented?

Is it a memory or an I/O address decoder?

How much memory or address space does it require and with what alignment?

After discovering this information, the programmer then uses the base address register to assign a start address to the address decoder. All of this information can be ascertained simply by writing all ones to the doubleword and then reading it back. A return value of zero indicates that the base address register isn't implemented. Since the base address registers must be implemented sequentially, discovery of the first un-implemented register indicates the device has no more decoders to be programmed. By scanning the returned value (assuming its non-zero) upwards from bit four of a memory base address register or from bit two of an I/O base address register, the programmer can determine the size of the required address space. The binary-register is 32 bits in size (64 bits if the memory block it describes can be located anywhere within 64-bit address space) and is used to implement a programmable memory or I/O address decoder. If bit zero is returned as a zero, the register is a memory address decoder. A one indicates an I/O address decoder. If one decoder is implemented, it must be implemented as base address register zero. If two decoders are implemented, they must be implemented as base address registers zero and one, etc. During configuration, the configuration software will stop looking for base address registers in a device's header when it detects an unimplemented base address register.

Figure 4A:
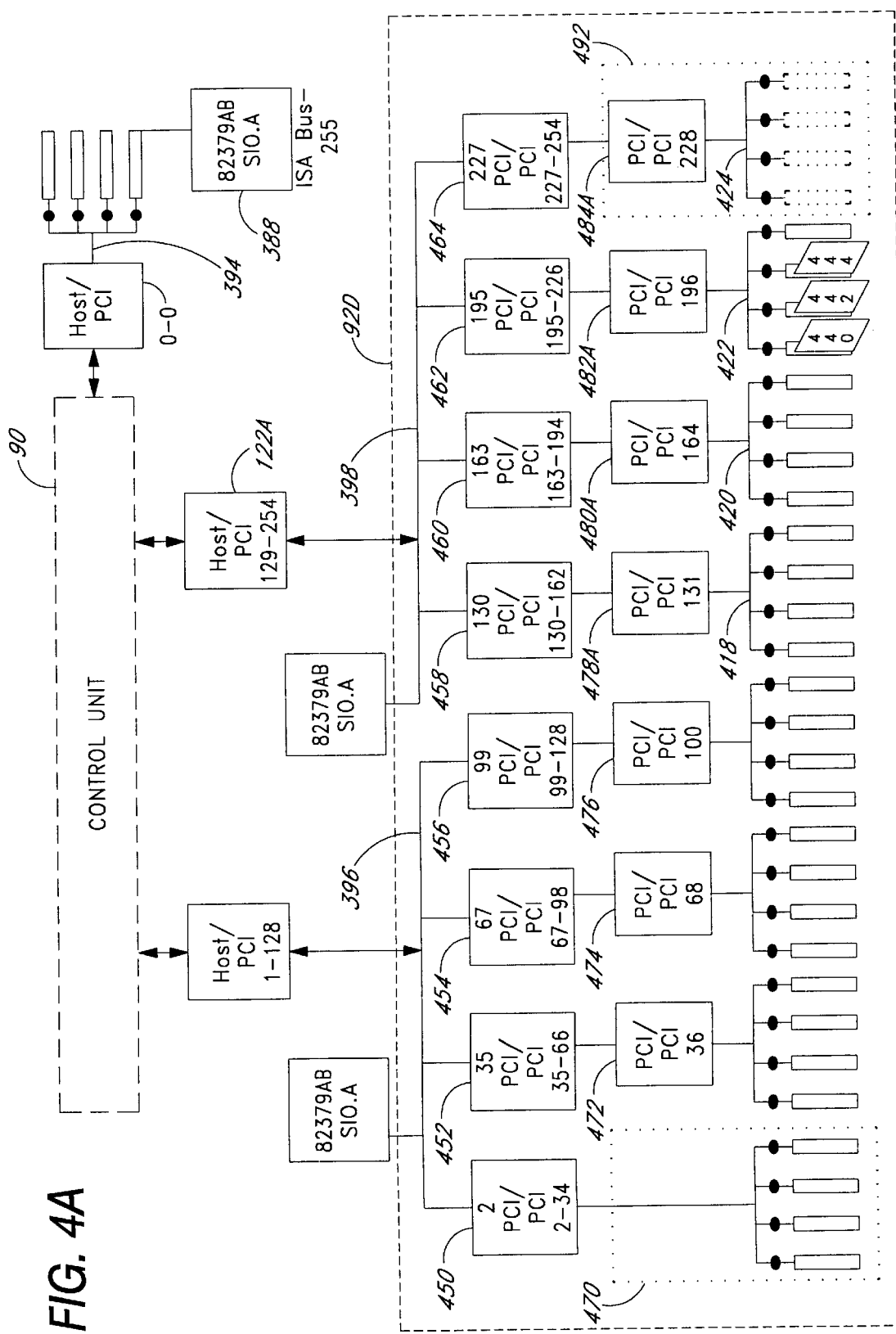
FIGS. 4A–B are hardware block diagrams of a computer system with bridges and canisters which support a hot-add and hot-swap.
Figure 4B:
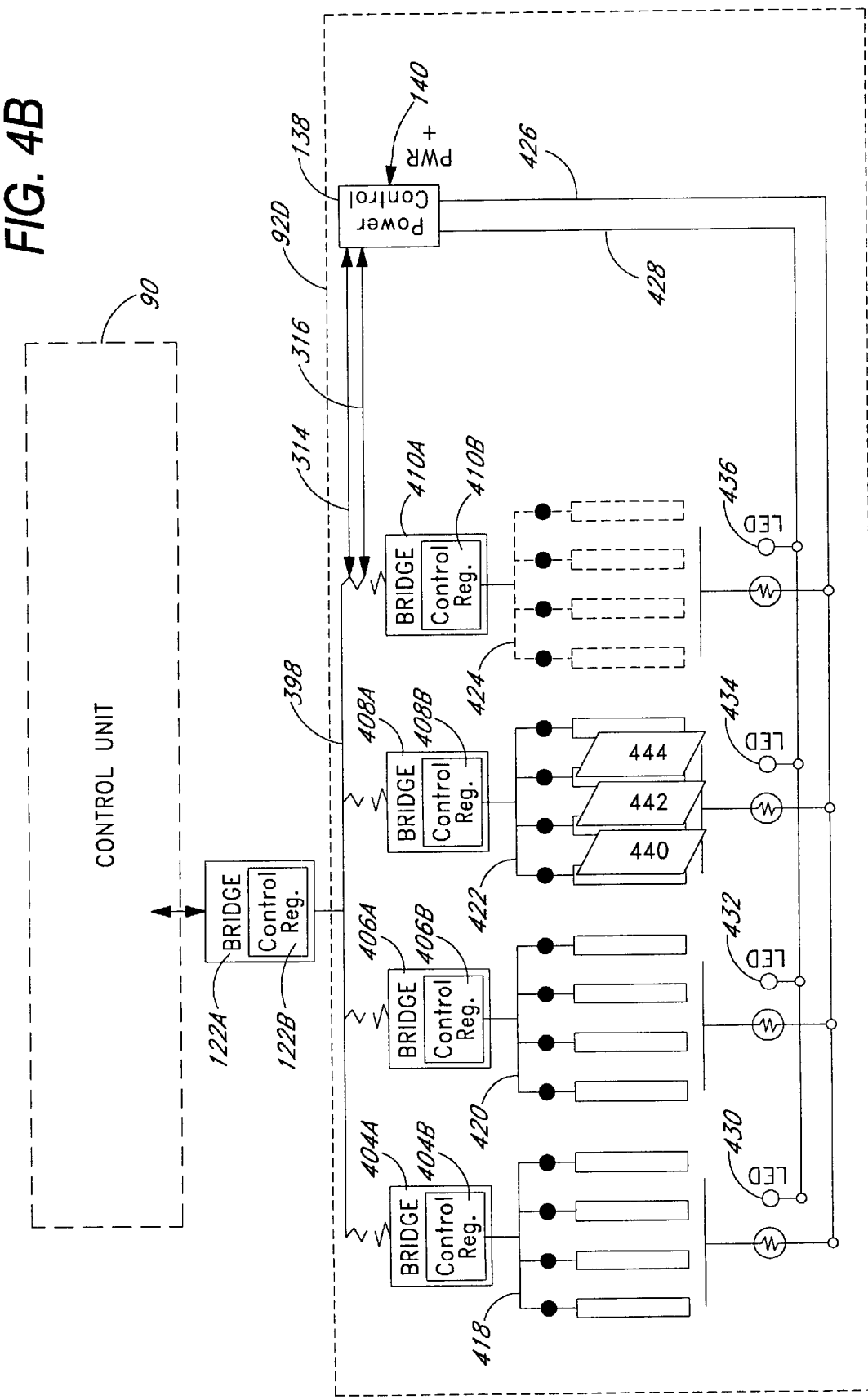
Figure 5:
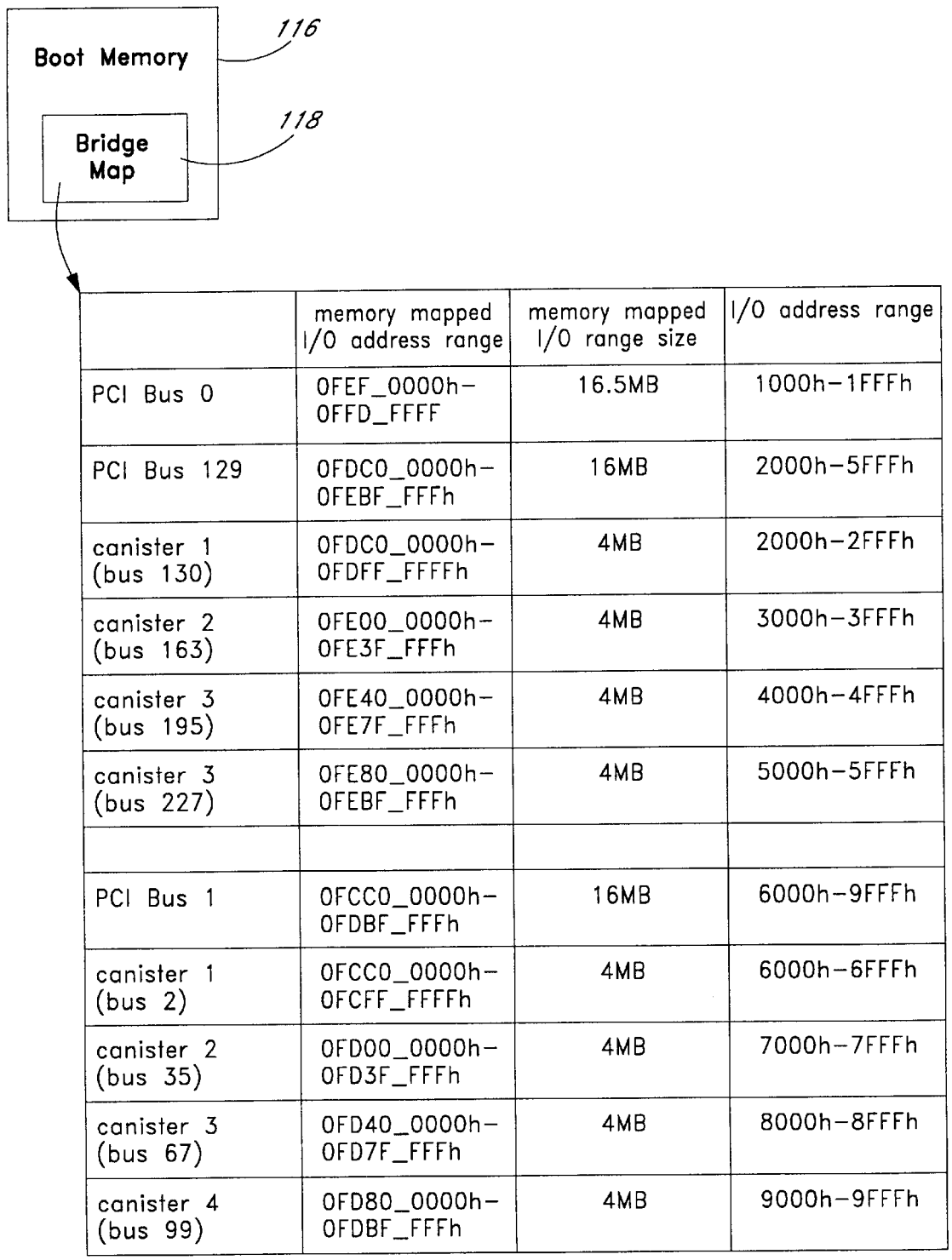
FIG. 5 is a map of the distribution of address spaces among busses in a hierarchical, multi-PCI bus computer system which supports hot-add.

FIGS. 4–5 illustrate a sparse mapping of bus numbers and address ranges. Sparse mapping refers to assigning bus numbers and address ranges sparsely as the buses are scanned at boot time, so that each bridge has a range allocated to it from which new adapter cards and bridges may be allocated bus numbers and address ranges when they are hot added to the computer. This preallocation results from sparse mapping processes 118 which allocates bus numbers and address ranges according to a sparse map [See FIG. 5] which is contained in boot memory. The sparse mapping processes are executed during booting of the computer system.

FIG. 4A shows an embodiment of an extensible PCI bus hierarchy. The base system features three PCI buses 394–398. One bus 394 is implemented entirely on the motherboard, and is intended to support embedded SCSI and video controllers, and the ISA bus. There are no PCI connectors on this bus. The other two buses 396–398 are provided for support of hot pluggable PCI cards. To support this, PCI-PCI bridges are utilized throughout the implementation of these latter two PCI buses.

For a prior art PC system, where the bridges and buses are discovered and assigned statically at boot time, the assignment procedure is a simple top down, left to right traversal of the PCI space, assessing the requirements of each PCI device on the way down, summing them and assigning address ranges, PCI bus numbers and programming the Secondary Bus Number 606, Maximum Subordinate Bus Number 622, base registers 610, 614 and limit registers 612, 616 for each PCI-to-PCI bridge on the way back up. A Plug and Play BIOS normally assigns these values contiguously by scanning all buses, PCI-to-PCI bridges and adapter cards. In a system where adapter cards, possibly containing PCI-to-PCI bridges themselves may be introduced long after the system booted, this arrangement is inadequate. Such newly introduced devices may not themselves be configurable because no bus numbers or adequate address ranges are available on that PCI bus.

However, where hot adding of PCI cards, devices and bridges is supported, bus numbers and address ranges must be sparsely allocated a priori to allow for addition of bridges during run-time.

PCI Bus Topology for an Intel Embodiment

An embodiment of a PCI-based computer system incorporating the present invention is shown in FIG. 4A. The following discussion assumes an embodiment conforming to Intel MPS 1.4. Other embodiments are possible, including ones conforming to other computer system specifications, such as the CHRP design for PowerPC from Motorola, IBM and Apple Computer.

In FIG. 4A, four backplane connectors (470–484) may be provided on each hot pluggable PCI bus (396, 398). Each of these is isolated from the PCI bus by an associated bridge (450–464). Into each connector may be plugged a canister containing four-PCI slots (490, for example), card guides and EMI shielding. Hot plugging is accomplished by removing and replacing this canister and any PCI cards in it. This embodiment incorporates one PCI-PCI bridge per four slot canister. There are thus five PCI buses in each of the two hot pluggable bus hierarchies, or ten PCI buses in the base system.

In addition to this passive canister, a second, active type of canister is disclosed. An I/O Processor (IOP) is incorporated in this type of canister which provides local intelligence to service the canister's adapter cards. The IOP may be any processor, including Intel Pentium®, Motorola PowerPC®, Intel 80960. In one embodiment, 492, the IOP is an Intel 80960RP, which includes, internally, an additional PCI-to-PCI bridge, and support for further isolating the card slots from the computer behind the intelligence provided in the IOP.

Each PCI bus may also include an Intel 82379AB SIO.A chip. For the motherboard PCI bus 394, this chip provides an ISA bridge, legacy devices such as real time clock, and an 8059A-compatible PCI. This PCI bus is also called the compatibility PCI bus. The I/O Advanced Programmable Interrupt Controller (APIC) portion of this chip is used for forwarding interrupts to the CPU 102. The SIO.A chips associated with the hot pluggable PCI buses are known as I/O APICs, and are initialized such their ISA components are in a passive state. When scanning the PCI buses, the BIOS must be aware that, due to subtractive decode in the 82379AB, the ISA portion of the I/O APICs will respond to all unclaimed I/O accesses.

In an embodiment, the INT A line of each PCI slot may be wired to a separate, PCI-compatible input of the IO APIC associated with its PCI bus. The remaining INT lines on the PCI buses may be wired to share these inputs to the associated IO APIC. Since each input to an IO APIC may be programmed to invoke a unique ISR when it is asserted to interrupt the CPU, this wiring insures that, when an ISR is invoked, one of only a minimal number of adapter cards may be asserting the interrupt. This, in turn, minimizes the number of devices which the ISR must query before finding the source of the interrupt. In systems where fewer IO APICs are provided, interrupt lines must be shared by many PCI slots, causing the ISR to query more adapter cards to find an interrupting card, and increasing the interrupt service latency.

Another embodiment provides one IO APIC for each four slots. INT lines of the PCI slots are wired each to a separate input of its associated IO APIC. In such an embodiment, each INT line can assert a unique interrupt and invoke a unique ISR, eliminating the need to share interrupts among device functions. In such an embodiment, a multifunction PCI card may have a unique interrupt assigned to each of its functions. The following table illustrates wiring of slot interrupt lines to I/O APICs in one possible embodiment:

number to the PCI bus implemented on the backplane. The missing bus numbers are removed from the allocation of the last slot on each backplane bus.

In another embodiment of FIG. 4A, only the left-most two PCI/PCI bridges and associated slots or canisters on each of the two backplane PCI buses (i.e., bus numbers 2–34, 35–66, 130–162, 163–194) are provided. The bus numbers assigned to the missing slots may be lost (i.e., reserved), or may be allocated among the implemented canisters according to some mapping other than the one described for the present embodiment.

In an embodiment where CPU 102 is an Intel Pentium(r) Pro, three PCI buses are generated by separate Intel 82450GX Orion-PCI-Bridge (OPB) chip sets. Each OPB has two ranges of I/O addresses which can be programmed to be ignored (handled by another bus), or recognized by this bus.

| Bus # | Slot # | 82379AB I/O APIC IRQ | ISA PIC IRQ | Bus # | Slot # | 82379AB I/O APIC IRQ | ISA PIC IRQ | Bus # | ISA Device | ISA PIC IRQ |
|---|---|---|---|---|---|---|---|---|---|---|
| 0 | PCI video | 9 | 9 | | | | | | | |
| 0 | PCI SCSI | 14 | 14 | | | | | | | |
| 2 | 1 | 3 | 10 | 130 | 1 | 3 | 11 | 255 | Timer | 0 |
|   | 2 | 4 | 10 |     | 2 | 4 | 11 | 255 | Keyboard | 1 |
|   | 3 | 5 | 10 |     | 3 | 5 | 11 | 255 | Secondary PIC | 2 |
|   | 4 | 6 | 10 |     | 4 | 6 | 11 | 255 | Com2 | 3 |
| 35 | 1 |   | 10 | 163 | 1 | 10 | 11 | 255 | Com1 | 4 |
|    | 2 |   | 10 |     | 2 | 11 | 11 | 255 | LPT2 | 5 |
|    | 3 |   | 10 |     | 3 | 14 | 11 | 255 | Floppy | 6 |
|    | 4 |   | 10 |     | 4 | 15 | 11 | 255 | LPT | 7 |
| 67 | 1 |   | 10 | 195 | 1 | 3 | 11 | 255 | RTC | 8 |
|    | 2 |   | 10 |     | 2 | 4 | 11 | 255 | Video | 9 |
|    | 3 |   | 10 |     | 3 | 5 | 11 | 255 | PCI BUS 1 (*) | 10 |
|    | 4 |   | 10 |     | 4 | 6 | 11 | 255 | PCI bus 129 (*) | 11 |
| 99 | 1 |   | 10 | 227 | 1 | 10 | 11 | 255 | Mouse | 12 |
|    | 2 |   | 10 |     | 2 | 11 | 11 | 255 | Math Error | 13 |
|    | 3 |   | 10 |     | 3 | 14 | 11 | 255 | SCSI | 14 |
|    | 4 |   | 10 |     | 4 | 15 | 11 | 255 | CDM | 15 |

(*) ISA IRQs for PCI Bus 1 and PCI Bus 129 must be disabled when in full APIC mode.

In an embodiment, the BIOS may initialize the interrupt system in Virtual-Wire mode before initializing any devices (see Intel MPS 1.4 for a description of virtual wire mode).

For an embodiment conforming to Intel MPS 1.4 Variable Interrupt Routing, the INT lines of all PCI slots of PCI buses 396 and 398 are also routed, through intervening logic, to inputs of the motherboard SIO chip's 8059A. In uniprocessor mode, these interrupts may be presented through the 8059A of 388 as ISA interrupts, or in another embodiment which utilizes virtual wire mode as APIC interrupts through the APIC of 388. Variable Interrupt Routing requires that this intervening logic be capable of suppressing presentation of interrupts through these ISA IRQs when running in full APIC or multiprocessor mode.

According to sparse bus mapping, the bus number space is statically partitioned across the maximum number of backplane slots such that each slot is allocated thirty-two bus numbers. In this embodiment, any one canister may have a PCI bus structure below it with, at most, thirty-one subordinate buses.

The bus number space may be allocated more or less equally between the two hot pluggable buses 396–398. One of the hot pluggable buses loses a bus number to the compatibility bus 394 (number zero). The other hot pluggable bus loses one number to the ISA bus (which must be bus 255). Also, each hot pluggable bus hierarchy loses a bus The SIO chip implements a number of ISA devices, ranging from the old AT motherboard devices (RTC, floppy) at port addresses below 100 h, to serial controllers at port ranges above 300 h. The two OPB registers don't provide enough granularity to allocate portions of the ISA port address range among the OPBs In the embodiment shown in FIG. 4A, all legacy ISA devices are realized on the primary PCI bus, through the chip 388 and associated external logic chip (serial, parallel, RTC, keyboard, etc.), as are an S3-based PCI video controller, and a PCI fast/wide SCSI controller. The legacy devices span the entire ISA range as shown in the following table.

| I/O Address Range | Reserved for: |
|---|---|
| 0000h–00ffh | PC/AT-compatible motherboard devices |
| 0100h–03ffh | ISA-compatible cards |
| 0400h–04ffh | EISA motherboard I/O devices |
| 0500h–7ffh | ISA I/O devices |
| 0800h–08ffh | EISA motherboard I/O devices |
| 0900h–0bffh | ISA I/O devices |

-continued

| I/O Address Range | Reserved for: |
| --- | --- |
| 0c00h–0cffh | EISA motherboard I/O devices |
| 0d00h–0ffh | ISA I/O devices |
| 1000h–ffffh | 15 EISA cards, x000h–xfffh per card |

Most ISA devices, as well as the PCI video and SCSI controllers, use ports in the range of 0100 h–03 ffh.

In an embodiment having multiple OPBs, the compatibility OPB (i.e., the one which has the ISA bridge associated with it) decodes all I/O references except those specifically disabled by the I/O Space Range registers (pp. 64–65 of the Intel OPB spec "82450 GX/KX PCISETS EDS", rev 2.3). The other OPBs will not decode any I/O references unless they are specifically enabled by these same registers. Further, the OPB will always alias I/O references to ISA I/O ports by masking the upper 16 bits of a 32 bit port address, passing only the low 16 bits (i.e., wrapping the addresses into the 64 KB ISA I/O space). The PCI Decode Mode register provides some deviation from this decode procedure. The overall affect of this is to limit the I/O range available in to 64 KB, limiting the space available for partitioning to each PCI bus.

The Intel MP Spec (1.4) defines three regions of the x86 address space as available for memory mapped I/O. Since the OPBs may implement subtractive decode (they will decode references to any address to which no one else responds), each OPB must be told which memory ranges it is to decode for I/O mapping, and which it is not (more correctly, each OPB is told which gaps in the x86 address space it should ignore). Since there are only two such memory gap registers in the OPB, the three ranges of memory mapped I/O addresses must be carved out of, at most, two contiguous address ranges.

In one embodiment, we define a 16 MB range for each PCI bus. The compatibility bus 394 uses the upper most 16 MB range (0FEF0_0000h-OFFD_FFFFh). Of this space, 1 MB will be reserved for a SCSI controller, and 8 MB for a video controller. The remaining 7 MB is available for future expansion. For the two remaining PCI buses 396–398, 32 MB is allocated and divided equally between the two buses immediately below the I/O APIC range (0FCE0_0000 H-OFDDF_FFFFh and 0FDE0_0000h-0FDF_FFFFh, for bus 129 and bus 1, respectively).

It is possible that a hot added PCI card may require more memory space than is left in bus' allocation. In one embodiment of the current invention, this condition may result in a configuration error, and the card will not be initialized. In such a situation, the offending card may be moved to another PCI bus or canister which has enough space remaining in its allocation. In another embodiment of the current invention, configuration software support may be provided which will scan the current configuration and allocated resources and suggest where to place the new card. In a third embodiment, existing address assignments may be adjusted to accommodate the new card.

PCI Configuration space is defined to be 64 double words for each PCI device function (i.e., for each of up to eight functions which each PCI device may support). The bus number, device and function are implicit in the 32-bit configuration address so no allocation or rationing of this space is needed. The boot memory 116 may maintain a database of buses, bridges and PCI devices and their addresses such as that shown in FIG. 5. Representation of this information may be designed such that the database may be edited, and queried through standard PC APIs (e.g., DMF, Card Services).

In an embodiment, as shown in FIG. 5, 4 KB of I/O address space is reserved for the compatibility PCI bus and each canister by using the I/O ranges assigned to EISA, Since no support is provided for the EISA bus.

The following sections outline the requirements of NetWare® by Novell Inc. of Orem Utah, Windows® NT by Microsoft of Redmond Washington and of the sparse bridge mapping processes 118 which are part of the boot memory 116 BIOS, with respect to routing of PCI interrupts and interrupt management. [See PCI System Architecture, Tom Shanley and Don Anderson, 1995, MindShare, Inc, ISBN: 0-201-40993-3 and from the Intel MPS Specification (Version 1.4), Appendix D each of which is incorporated herein by reference as if fully set forth herein.

NetWare□ provides support for up to four PCI buses, and 64 PCI interrupt vectors. PCI interrupts are assumed to be routed through an I/O APIC, where each PCI interrupt may be separately mapped to an IRQ. NetWare provides all APIC programming, as long as the design includes an Intel I/O APIC. Novell would like the APICs to be I/O mapped. NetWare also requires that individual PCI interrupts be "peeled" away from the ISA interrupt controller, and rerouted as full APIC interrupts.

NetWare expects the BIOS to provide a table compatible with MPS 1.4. NetWare does not perform its own PCI discovery, and makes no assumptions about the MPS 1.4 table being static.

NetWare supports a variety of PCI controller cards which can be accessed via the ISA IO Port space, as well as being accessible as PCI devices. NetWare requires that these cards support currently shipping legacy drivers, wherever the cards are plugged in. This requires that two hot pluggable buses 396–398 [see FIG. >4A] be mapped into the ISA IO space, and the ISA IRQ space, as well as being treated as peer PCI buses (i.e., they must be dual mode).

Windows NT□ requires the BIOS to have built an MPS table, compliant with the MPS 1.4 spec. NT does not rescan the PCI bus, and does not rebuild the table.

In the Intel Pentium Pro embodiment described above, the MP configuration table is be positioned in read/write memory, and completed to reflect the actual buses, devices, and address assignments. Devices in the table which are not present, or not functional, are either removed from the table, or flagged as not functioning.

A Floating Pointer Structure and MP Configuration Table may provided. The MP Configuration Table will be large (4600 bytes or larger), and so must be implemented at the top of extended memory. The entire maximum topology of the embodiment being described in reference to FIG. 4A may be reflected in the following OEM configuration table, including both 82379AB I/O APICs and 80960RPs. This may be done in order to accommodate hot adding of components. If external bridge components are dynamically added, the Configuration Table will have to be edited and rewritten, so that entries appear in the right order.

The following is an OEM Configuration Table which may be used to connect to the configuration database shown in FIG. 5.

| Code | Length (bytes) | count in table | comments |
| --- | --- | --- | --- |
| Processor | 0 | 20 | 4 | |
| Bus | 1 | 8 | 256 | |
| I/O APIC | 2 | 8 | 9 | |
| I/O Interrupt | 3 | 8 | 15 | ISA ints |
| | 3 | 8 | 128 | pluggable w/o 80960RP |
| | 3 | 8 | 128 | pluggable w/ 80960RP |
| Sys Addr Mapping | 128 | 8 | 3 | |
| Bus Hierarchy | 129 | 8 | 17 | |
| Compat. Bus Mapping | 130 | 8 | 1 | |

In FIG. 4B a detailed view of bridges 404A–410A is shown. These bridges are initially set forth in FIG. 4A. Control unit 90, primary bridge 122A and swap/add unit 92D are shown. Bridge 122A includes configuration register 122B. Swap/add unit 92D includes bridges 404A–410 A, canisters 418–422, power switch 138 and LEDs 430–436. Each of bridges 404A–410A includes respectively, control registers 404B–410B. Canister 422 includes adapter cards 440–444. Control unit 90 is connected via bridge 122A to bus 398. Bridges 404A–410A each connect via intermediate bridges [see FIG. 4A] to primary bus 398. Canisters 418–422 each connect to bridges 404A–408A. Bridge 410A is not connected to a canister. Canisters 418–422 each include four slots for peripheral cards. Canister 422 includes cards 440–444 in three of its four available slots. Bridge 410A is configured to accept a canister referenced as 424 but in the example shown does not contain such a canister.

Power control 138 is connected via signal lines 314 and 316 to bus 398. Power control 138 is also connected to power lines 140. Power control is connected via signal lines 428 to each of LEDs 430–436 associated with, respectively, canisters 418–422 and interface 424. Power control 138 is also connected via individual power lines 426 to each, respectively, of canisters 418–422 and to canister slot 424.

In order to implement a Hot-Add environment in a PCI architecture each of bridges 122A and 404A–410A may be configured to reserve sufficient address space not only to support those peripheral devices physically present in the system but also to support those devices which might be added to this system after boot-up. In the example shown in FIG. 4 the only devices physically present at boot-up are bridges 122A and 404A–410A and peripheral devices 440–444. Nevertheless, a sparse map similar to that discussed above in connection with FIG. 5 may,for example, requires each bridge to reserve 4 MB per canister. The sparse map is contained in boot memory 116. Sparse bridge mapping processes 118 [see FIG. 1], which may be included as part of the system BIOS, configure the computer on power up in accordance with the sparse bridge map. The bridge mapping code 118 stored in boot memory 116 may cause the processor 102 to write to the configuration registers of bridges 404A–410A and 122A a range of addresses similar to those present in the table shown in FIG. 5. The reserved address range may be greater than required by the actual physical devices on the secondary side of each bridge The operation of a PCI bus and PCI-to-PCI bridges is well known to anyone of ordinary skill in the art, as are the details of programming configuration spaces of PCI devices, and the manner in which a PCI-to-PCI bridges passes addresses and data through to a bus on the other side.

FIGS. 8A–B show the processes associated with implementing an embodiment of a computer system incorporating hot-add and hot-swap in a bridge only architecture such as that shown in FIG. 3. Certain steps in the process are presented in more detail in the U.S. patent application Ser. No. 08/942,282, titled HOT ADD AND SWAP OF DEVICES SOFTWARE ARCHITECTURE commonly owned, and filed on the same date, which is hereby incorporated by reference.

Processing commences at process 800. In process 800 a request to initiate a hot-swap or hot-add slot 306 is received. Control is next passed to process 802 in which program code 98 for hot swap and hot add [see FIGS. 1–3] locates any drivers associated with card slot 306, suppresses new requests to the drivers and allows in progress requests to complete. In an embodiment with canisters, hot adding a card to a canister may involve drivers associated with other cards in the same canister. This software function is described in detail in the above referenced application. When all drivers associated with the card slot to be swapped have quiesced, including drivers for cards co-resident in a canister, control proceeds to 808.

In process 808 a processor 102 writes a register of bridge 200 placing the bridge in reset, and disconnecting the secondary side of the bridge. In an embodiment where a canister of devices is connected to the bridge then those devices will be disconnected as a group. Control is then passed to process 810. In process 810 the bridge drives the reset signal line for the affected device or devices active. This has the effect of placing the card in a reset state. Control is then passed to process 812. In process 812 program code 98 [see FIG. 1] for hot-swap and hot-add causes processor 102 to send a power-down signal to the power control 138. In an embodiment of power control 138, a control register is connected to the ISA bus of control unit 90, writable by software running on microprocessor 102. The command is passed by program code 98 writing the appropriate bits of this control register. Control then passes to process 814 which is implemented in an embodiment in the power control itself. The power control shuts down power to the affected slots (s). Control is then passed to process 816 also implemented by the power control. In process 816 the power control changes the LED associated with the device(s) being powered down from a green or enabled condition to an amber condition. The amber condition indicates that the slot and/or canister is ready for hot swap or hot add. Control then passes to decision process 818 where the hot-swap/add program code 98 checks whether the power down has completed successfully. In an embodiment of power control 138, a status register is connected to the ISA bus of control unit 90, readable by software running on microprocessor 102, indicating this condition. When a determination is reached that the slot or canister is powered down, control passes to process 820. In process 820 hot-swap/add program code causes microprocessor 102 to notify the requesting agent that power down is complete. Control then passes to splice block A.

FIG. 8B shows an embodiment of the processes associated with power-up in a bridge only architecture for hot-swap/add implementation (also see FIG. 3). Processing commences at decision process 850 to which control is passed via splice block A. In decision process 850 a determination is made as to whether a power-up request has been receivedReceiving a power-on request, control is passed to process 852. In process 852 a power-on command is issued to power control 138. [see FIGS. 3–4]. In an embodiment of power control 138, a control register is connected to the ISA bus of control unit 90, writeable by software running on microprocessor 102. The command is passed by program code 98 writing the appropriate bits of this control register.

Control is then passed to process 854. In process 854 the power control 138 switches power to the card slot or, in an embodiment with canisters, to the canister, which has been hot-swapped/added. Control then passes to process 856. In process 856 the power control switches the appropriate LED from an amber to a green or ready condition. This identifies to the user that the specific slot/canister being hot-swapped/added has power to it. Control is then passed to decision process 858, which checks whether the power down has completed successfully. In an embodiment of power control 138, a status register is connected to the ISA bus of control unit 90, readable by software running on microprocessor 102. Power control 138 sets a bit in the status register when power has stabilized. When hot-swap/add processes 98 determines power has stabilized, control is then passed to process 860. In process 860 software writes the appropriate register of bridge 200 taking the bridge out of reset, and reconnecting the secondary side. This process also reprograms the bridge configuration. Control is then passed to process 862. In process 862 the drivers associated with slot 306 and, in an embodiment so equipped, the other slots of canister 300, are found and are enabled. Control is then passed to decision process 866. In decision process 866 a determination is made as to whether a hot-add is being performed. If this determination is in the affirmative control passes to process 870, if it is in the negative control passes to process 872. In process 870 a hot-add is being performed. In process 870 the configuration registers of the device being added is read and those needs are matched with available system resources. Control is then passed to process 872. In process 872 the requesting agent is notified of the successful or unsuccessful completion of a hot swap or add.

Figure 9A:
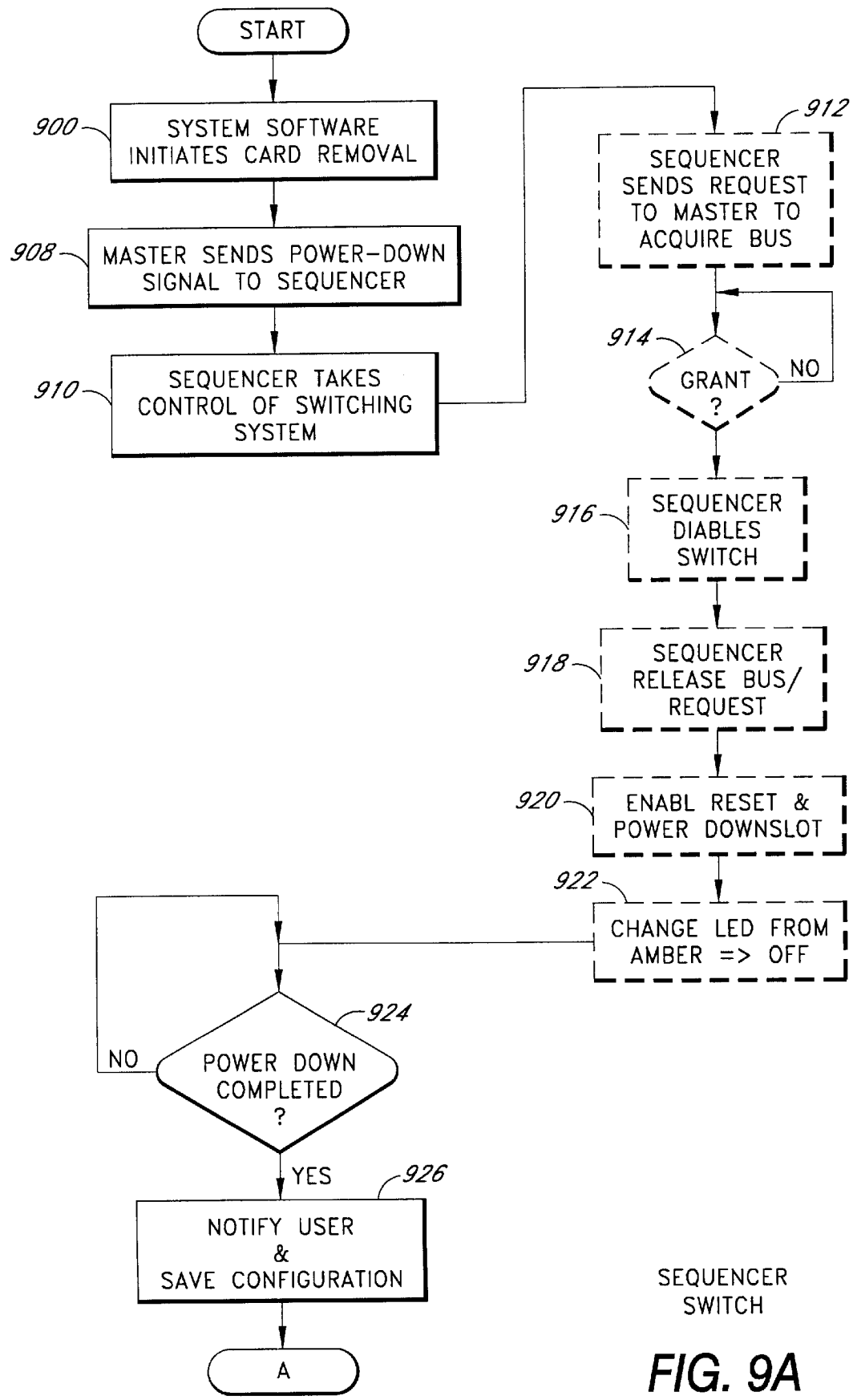
FIGS. 9A–B are process flow diagrams for hot-add and hot-swap in a computer system utilizing sequencer and switch architecture.
Figure 9B:
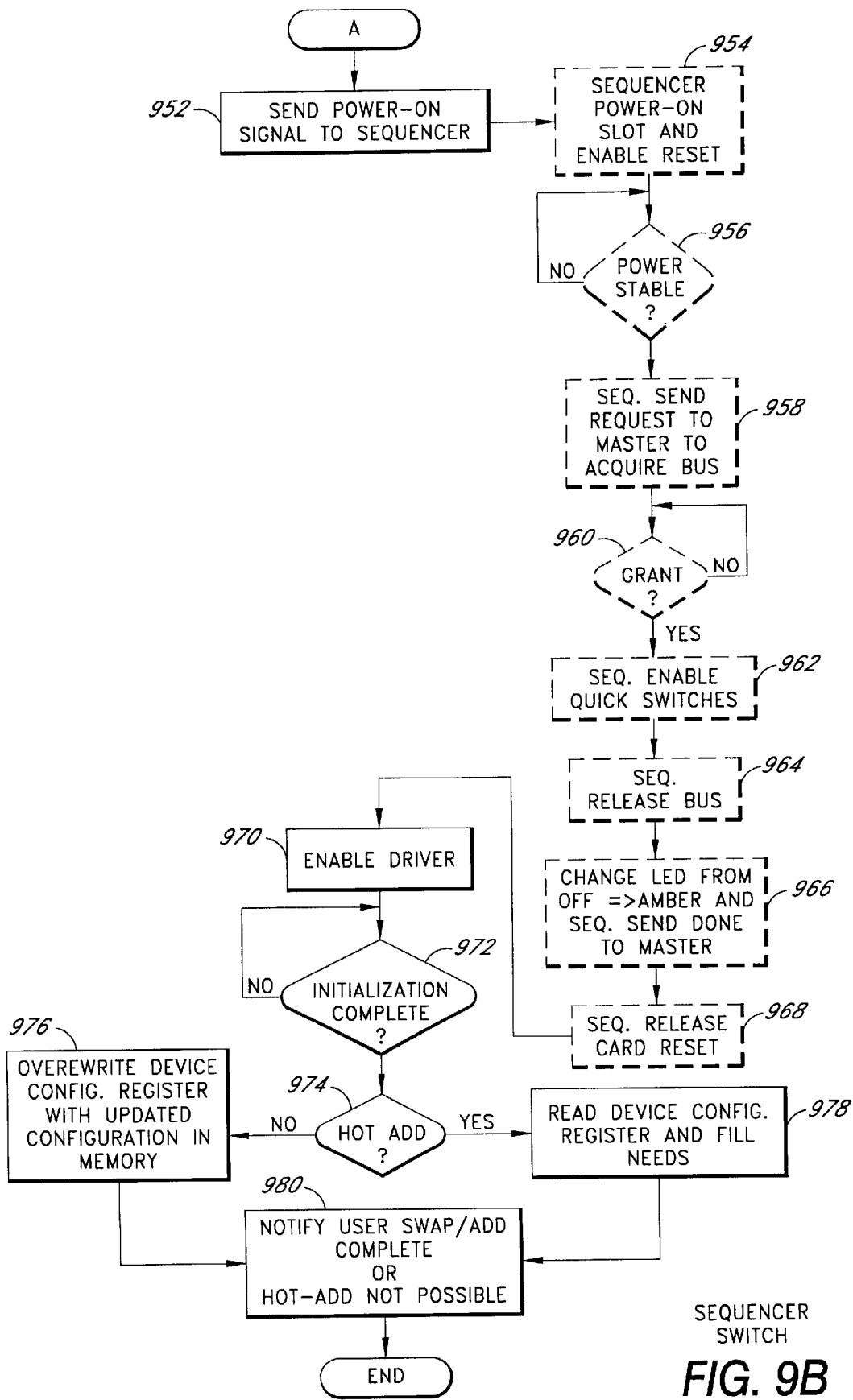

FIGS. 9A–B show the processes implemented in an embodiment of a sequencer and quick switch environment for controlling hot-add and hot-swap as shown in FIG. 1. FIG. 9A deals with the processes implemented within the sequencer 126, power control 138 and quick switch 142. Generally the processes implemented in the control unit are shown in solid lines while those implemented in the hot swap-hot add unit, i.e., sequencer, quick switch and power control are shown in dashed outline. Processing commences at process 900 in which system software initiates a request to physically remove the adapter in card slot 150, or hot add a card to slot 150. Control is passed to process 908. In process 908 control unit 90 [see FIGS. 1–2] sends a "power-down" signal to the sequencer associated with the card slot 150 to be powered down. In one embodiment of sequencer 126, a control register is connected to the ISA bus of control unit 90 writable by software running on microprocessor 102. The signal is passed by writing the appropriate bit of this control register. Control is then passed to process 910 in which the sequencer assumes control of the power-down. Control is then passed to process 912.

In process 912 processing has been passed to the sequencer 126 or 128 [see FIGS. 1–2]. In process 912 the sequencer sends a REQ# signal to the PC buss master to acquire the buss. Control is then passed to decision process 914. In decision process 914 the sequencer awaits a response from the PCI bus master in a form of a GNT# signal. When the GNT# signal is received control is then passed to process 916. In process 916, the sequencer disables the quick switch 142 or 144, thereby disconnecting the slot and any adapter card currently plugged into that slot from the PCI bus. Control is then passed to process 918. In process 918 the sequencer releases exclusive access to the PCI bus by releasing the REQ# signal line. Control is then passed to process 920. In process 920 the sequencer asserts the reset line to the adapter card. [See FIGS. 1–2 reference numerals 164–166.] The sequencer also in process 920 sends a "power-down" signal to power control 138 [see FIGS. 1–2]. Control is then passed to process 922. In process 922 the power control removes power from the selected slot and any associated peripheral device currently connected to that slot. The power control also changes the LED associated with the affected slot(s) from an amber condition to an off condition indicating to the user that a particular slot has been powered down. In an embodiment of power control 138, a status register is connected to the ISA bus of control unit 90, readable by software running on microprocessor 102. This status register is set to reflect the state of power at the slot in question. Controlled then returns to the control unit in decision process 924.

In decision process 924 the determination is made as to whether a "done" signal has been sent by power control unit to the sequencer and from the sequencer to the control unit. That signal confirms that power has been removed from the device. When that signal is received by the control unit (by reading the status register in an embodiment with such a register), control is passed to process 926. In process 926 system software completes processing the hot swap or add request. Control then passes to splice block A.

In FIG. 9B the processes in both the control unit 90 and the hot-swap/add unit 92 [see FIGS. 1–2] for power-on and device enablement are shown. Processing commences at decision block 952. In process 952 the control unit sends a power-on signal to the sequencer associated with the adapter card to be enabled. Control then passes to the processes implemented in the hot-add/swap unit 92A–B [see FIGS. 1–2] and specifically process 954.

In process 954 the sequencer sends a power on signal to the power control unit 138 [see FIGS. 1–2]. The power control, in response, sends power to the selected device. Additionally, the sequencer asserts the reset line between it and the associated card slot [see reference numerals 164–166, FIGS. 1–2]. Control is then passed to decision process 956. In process 956 a determination is made by power control 138 as to whether stable power condition exists on the peripheral device. When a determination in the affirmative is reached, control is passed to process 958. In process 958, the sequencer sends a REQ# signal to the PCI buss master in order to acquire the buss. Control then passes to process 960. In process 960 the sequencer awaits a GNT# signal from PCI buss master indicating that the bus is available. When the determination in the affirmative is reached, i.e., that the sequencer and its associated peripheral device has been granted master status on the PCI buss control passes to process 962. In process 962 the sequencer enables the quick switch(s) associated with the peripheral device or devices to be enabled, thus reconnecting the device(s) to the PCI bus 124 [see FIGS. 1–2]. Control then passes to process 964. In process 964 the sequencer releases the REQ# signal on the PCI buss. Control is then passed to process 966. In process 966 sequencer sends a command to the power control to cause it, the power control, to change the associated LED from an off to an amber condition. This indicates to the user that power has been supplied to the adapter card. The sequencer also accepts a "done" signal from the power control when that unit determines that stable power has been provided to the device being swapped or added in. This "done" signal is passed by the sequencer to the control unit and control passes to process 968. In process 968 the sequencer releases the card reset signal line. Control is then passes to process 970.

In process 970, the card is now ready to be used by software. The patent application referenced earlier in this discussion describes the software processes in detail. In process 970 the control unit matches and enables the appropriate driver(s) for the peripheral device(s) being enabled. Control is then passed to decision process 972. In decision process 972 the peripheral device is allowed to initialize itself. When the device has initialized itself control is passed to decision process 974. In decision process 974 a determination is made as to whether a hot-add or hot-swap is being conducted. In the event a hot-add is being conducted control passes to process 978. In the event a hot-swap is being conducted control passes to process 976. In process 976, the control unit initiates communications with the enabled peripheral device and updates the configuration register of the device with the appropriate remap configurations 110 or 112 [see FIGS. 1–2]. Control is then passed to process 980.

Alternately, if a hot-add is being performed control is passed to process 978. In process 978 the control processes read the configuration register of the added device(s) and allocate appropriate system resources if available. Control is then also passed to process 980. In process 980 the user is notified of the completion of a hot-swap/add. Additionally, if a hot-add is being performed, and if resources are not available to complete device restarting, then the user is notified.

Figure 10A:
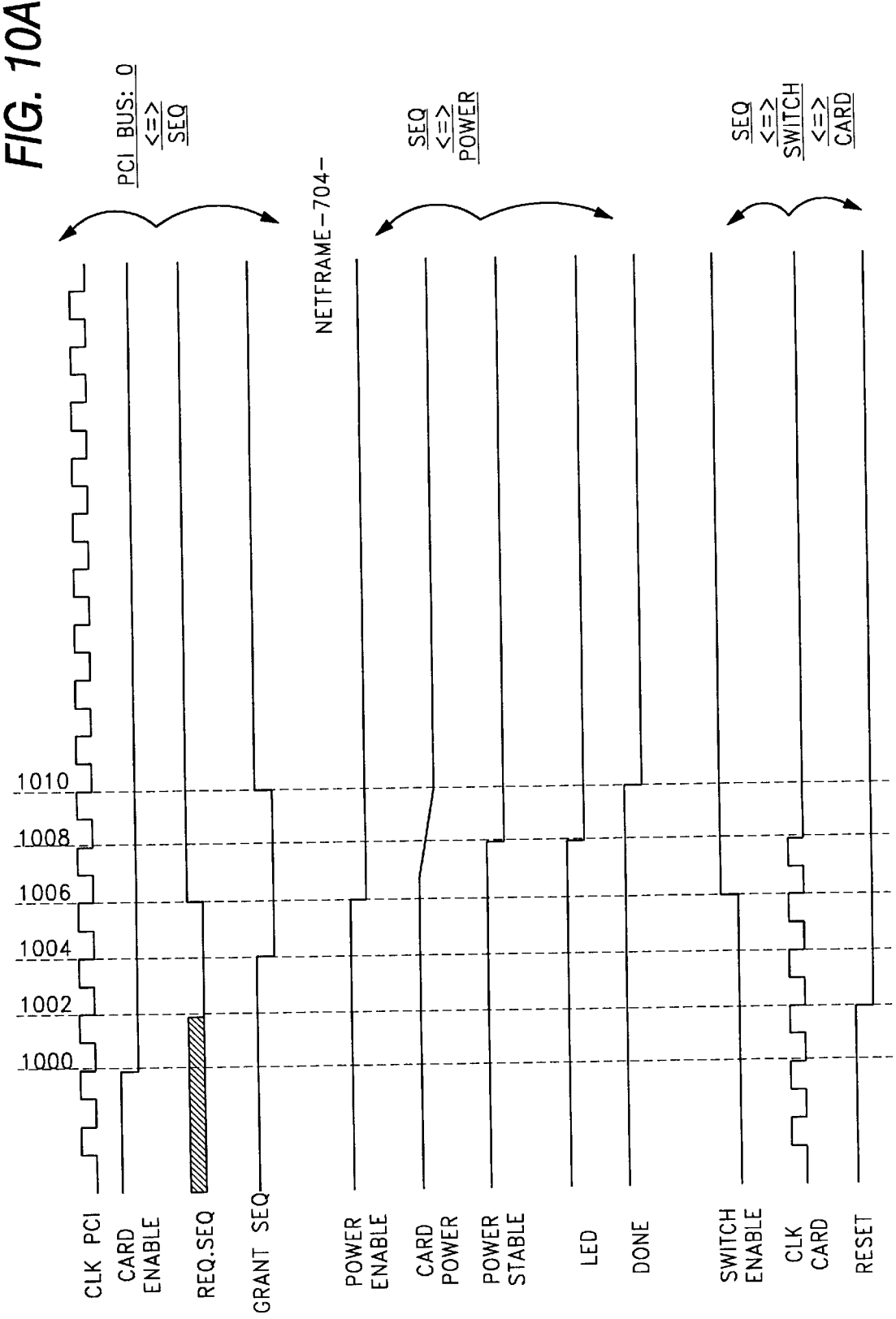

FIGS. 10-A and -B show respectively the signals associated with power-down and power-up in a hot add/swab sequence or switch architecture. Three groups of signals are shown. The first group of signals includes PCI clock, card, enable, signal and REQ# and GNT# signals. These signals exist on the primary bus to which the sequencer is attached. The next group of five signals, power enable, card power, power stable, LED and "done" signals are associated with the sequencer and power control units. See for example sequencers 126–128 and power control 138 in FIGS. 1–2. The final group of three signals: switch enable, card clock and reset signal are signals found at the card slot level. See for example slots 142–144 in FIGS. 1–2.

In FIG. 10-A processes associated with powering down a selected slot for hot-swap/add are shown. Vertical reference lines 1000–1010 indicate the sequence of events. At interval 1000 card enable signal is passed to the sequencer from the control unit. As discussed above in connection with FIGS. 1 and 2 that signal may be passed via the PCI bus to which the sequencer is attached or may be independently delivered to the sequencer by, for example, a programmable array logic (PAL) attached to another bus in the system. At interval 1002 a REQ# signal is asserted by the sequencer on the PCI bus. Concurrently the sequencer sends to the card slot a reset signal.

At interval 1004 a GNT# signal from the PCI bus arbiter is detected by the sequencer. At interval 1006 the sequencer sends a "power-down" signal to the power control. Additionally, at interval 1006 the sequencer sends a switch disable signal to the quick switch to disconnect the card slot from the bus. At interval 1008 card power has been reduced to a level sufficient to cause a power unstable signal, to be sent from the power control unit to the sequencer. Additionally, at interval 1008 LED associated with the selected slot/peripheral device changes from green to amber. Additionally, at interval 1008 a PCI clock is no longer present at the card. All communications to the card through the quick switch having been disabled. Finally, at interval 1010 sequencer sends a "done" signal to the control unit and the GNT# signal is no longer generated by the PIC arbiter.

In FIG. 10B the processes associated with re-enabling a hot-swap/add of a peripheral device in a sequencer and switch architecture are shown. Commencing at interval 1050 card enable signal is sent to the sequencer from the control unit. In response the sequencer sends a power enable signal to the power control unit. Then at interval 1052 card power begins to transition to a operational power level. At interval 1054 card power has stabilized an acceptable power level. The associated LED has transitioned from an amber to a green condition. Then at interval 1056 a power stable signal is passed from the power control unit to the sequencer. At interval 1058 the sequencer sends to the PCI bus master a REQ# signal. At interval 1060 the PCI bus arbiter generates a GNT# signal which is received by the sequencer. At interval 1062 the sequencer enables the quick switch with which it is associated. At interval 1064 the sequencer releases the REQ# signal. At interval 1066 the sequencer receives a "done" signal from the power control unit indicating that power is stable. Additionally, at interval 1066 the bus arbiter removes the grant signal from the PCI bus for the sequencer. Finally, at interval 1068 the device is in operation and the only remaining steps concern the initialization of the device, matching of device drivers, and device configuration. In the case of a hot-swap remapping of the devices configuration registers with the configuration of the device being replaced is appropriate. In the case of a hot-add, a determination of device configuration and an allocation of system resources is appropriate.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

GLOSSARY

Windows NT. (Windows New Technology) An advanced 32-bit operating system from Microsoft for x86, MIPS, Alpha and PowerPCmicroprocessors. Introduced in 1993, NT does not use DOS, . . . operating system. NT runs . . . Although NT runs in a 386, it is best suited for a high-end Pentium-class machine.

Features include peer-to-peer networking, preemptive multitasking, multithreading, multiprocessing, fault tolerance and support for the Unicode character set. NT provides extensive security features and continually tests the validity of application requests even after the application has been opened.

Appendix A
Incorporation by Reference of Commonly Owned Applications
The following patent applications, commonly owned and filed October 1, 1997, are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |

-continued

Appendix A
Incorporation by Reference of Commonly Owned Applications
The following patent applications, commonly owned and filed October 1, 1997,
are hereby incorporated herein in their entirety by reference thereto:

| Title | Application No. | Attorney Docket No. |
|---|---|---|
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Statistics" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method of hot adding an adapter to an operational computer having a primary bus and at least one secondary bus, the secondary bus being connected to the primary bus by a bus-to-bus bridge and the secondary bus being connected to one or more adapters, the method comprising:

selecting a range of addresses represented by an upper bound address and a lower bound address for the bus-to-bus bridge;

storing the upper bound address and the lower bound address in a control register in the bus-to-bus bridge; and adding the adapter to the secondary bus such that the adapter is addressable by the operational computer within the selected range.

2. The method of claim 1, additionally comprising supplying power from the computer power supply to the adapter.

3. The method of claim 1, additionally comprising receiving a request in a hot plug program for the hot add of the adapter, the request being generated by a user of the operational computer.

4. The method of claim 1, wherein the adapter is capable of connection to a PCI bus.

5. The method of claim 1, wherein the addresses are memory mapped input/output addresses.

6. The method of claim 1, wherein the addresses are memory addresses.

7. A method of configuring a computer having a primary bus that is connected to a plurality of bus-to-bus bridges for the hot add of an adapter, the method comprising:

selecting a range of bus numbers represented by a lower bound bus number and an upper bound bus number for each of the plurality of bus-to-bus bridges, the range of bus numbers being selected such that the bus numbers of the computer are sparsely allocated across each of the bus-to-bus bridges; and storing the upper bound bus number and the lower bound bus number in each bus-to-bus bridge.

8. The method of claim 7, additionally comprising:

connecting a new secondary bus to one of the bus-to bus bridges; and assigning an unused bus number within the selected range of bus numbers stored in the bus-to-bus bridge.

9. The method of claim 8, wherein the new secondary bus is on a canister.

10. The method of claim 8, wherein the new secondary bus is a PCI bus.

11. The method of claim 8, additionally comprising adding an adapter to a secondary bus that is connected to one of the bus-to-bus bridges.

12. A method of hot adding an adapter to an operational computer having a primary bus, a bus-to bus bridge connected to the primary bus, a secondary bus connected to the bus-to-bus bridge, and a plurality of bus slots connected to the secondary bus, the method comprising:

designating a first range of addresses represented by an upper bound address and a lower bound address to the bus-to-bus bridge;

disabling power to the secondary bus;

adding an adapter to a bus slot such that the adapter is addressable by the operational computer; and enabling power to the secondary bus.

13. The method of claim 12, wherein the adapter is configured to communicate with a PCI bus.

14. The method of claim 12, additionally comprising storing the first range of addresses represented by the upper bound address and the lower bound address in a control register in the bus-to-bus bridge.

15. The method of claim 12, additionally comprising quiescing all signals on the bus after negotiating control of the bus.

16. The method of claim 12, wherein each of the addresses in the first range of addresses are memory addresses.

17. The method of claim 12, additionally comprising supplying power to the bus from the computer power supply.

* * * * *

UNITED STATES PATENT AND TRADEMARK OFFICE
CERTIFICATE OF CORRECTION

PATENT NO.   : 6,418,492 B1
DATED        : July 9, 2002
INVENTOR(S)  : Papa et al.

It is certified that error appears in the above-identified patent and that said Letters Patent is hereby corrected as shown below:

<u>Title page,</u>
Item [73], Assignee, please replace the Assignee "Micron Electronics, Nampa, ID" with -- Micron Technology, Inc., Boise, ID -- .

Signed and Sealed this

Tenth Day of June, 2003

JAMES E. ROGAN
*Director of the United States Patent and Trademark Office*